US009015373B2

(12) United States Patent
Deguchi

(10) Patent No.: US 9,015,373 B2
(45) Date of Patent: Apr. 21, 2015

(54) STORAGE APPARATUS AND METHOD OF CONTROLLING STORAGE APPARATUS

(75) Inventor: Makoto Deguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/512,145

(22) PCT Filed: May 17, 2012

(86) PCT No.: PCT/JP2012/003235
§ 371 (c)(1),
(2), (4) Date: May 25, 2012

(87) PCT Pub. No.: WO2013/171796
PCT Pub. Date: Nov. 21, 2013

(65) Prior Publication Data
US 2015/0058503 A1    Feb. 26, 2015

(51) Int. Cl.
G06F 3/00        (2006.01)
G06F 13/00      (2006.01)
G06F 3/06        (2006.01)

(52) U.S. Cl.
CPC ............ *G06F 3/0613* (2013.01); *G06F 3/0659* (2013.01); *G06F 3/067* (2013.01)

(58) Field of Classification Search
None
See application file for complete search history.

(56) References Cited

U.S. PATENT DOCUMENTS

2002/0002655 A1 *    1/2002    Hoskins .................... 711/112

FOREIGN PATENT DOCUMENTS

WO    2010079535 A1    7/2010
WO    2011158296 A1    12/2011

*Primary Examiner* — Zachary K Huson
(74) *Attorney, Agent, or Firm* — Volpe and Koenig, P.C.

(57) ABSTRACT

A storage apparatus capable of achieving both an improvement in efficiency of data transfer processing and an improvement in availability and a method of controlling the storage apparatus are provided. A storage apparatus which includes a storage medium for providing an external apparatus with a data storage area includes: a processing unit including multiple processors which execute synchronous processing and asynchronous processing other than the synchronous processing, the synchronous processing being processing to be executed immediately in response to data I/O requests from the external apparatus, the asynchronous processing being processing to be executed as needed in response to a processing request generated in the storage apparatus; a temporary storage unit which provides a storage area where any of the processors temporarily stores write target data in accordance with a data write request among the data I/O requests; and a processor operating rate management part which manages a time schedule for each of the multiple processors to execute the synchronous processing or the asynchronous processing. In the storage apparatus, the processor operating rate management part acquires execution pro-portions of the synchronous processing and the asynchronous processing executed by each of the multiple processors in a past predetermined time period and an usage state of the temporary storage unit used by the multiple processors, compares the acquired execution proportions and the usage state with execution proportions of the synchronous processing, the asynchronous processing, and intensive writing processing set in advance for each of the processors, the intensive writing processing being processing of writing from the temporary storage unit to the storage medium, the execution proportion of the intensive writing processing defined corresponding to the usage state of the temporary storage unit, and sets an operation schedule of the multiple processors in such a way that at least one of the processors executes the synchronous processing at any point in a predetermined execution proportion management unit time.

15 Claims, 21 Drawing Sheets

Fig. 9

MP OPERATING RATE MANAGEMENT TABLE 1340

| PACKAGE | MPPK1 | | | |
|---|---|---|---|---|
| MPID | MP1 | MP2 | ... | MP4 |
| OVERALL | 80 | | | |
| SYNCHRONOUS PROCESSING | 70 | 50 | ... | 40 |
| ASYNCHRONOUS PROCESSING | 30 | 50 | ... | 60 |
| INTENSIVE WRITING PROCESSING | 50 | 70 | ... | 50 |

Fig. 10

CACHE DIRTY RATIO TABLE 1341

| CACHE DIRTY RATIO |
|---|
| 50 |

Fig. 11

JOB OPERATING TIME PERIOD TUNING TABLE 1342

| PACKAGE | MPPK1 | | | | CACHE DIRTY RATIO | | |
| --- | --- | --- | --- | --- | --- | --- | --- |
| | | | | | 10 | 20 | 90 |
| | ASYNCHRONOUS PROCESSING OPERATING RATE | SYNCHRONOUS PROCESSING OPERATING PROPORTION | ASYNCHRONOUS PROCESSING OPERATING PROPORTION | | INTENSIVE WRITING PROCESSING OPERATING PROPORTION | | |
| SYNCHRONOUS PROCESSING OPERATING RATE | | | | | | | |
| 10(1) | 90(1) | 10(1) | 90(1) | | 10(1) | 20(1) | 90(1) |
| ⋮ | ⋮ | ⋮ | ⋮ | | ⋮ | ⋮ | ⋮ |
| 90(1) | 10(1) | 90(1) | 10(1) | | 10(1) | 20(1) | 90(1) |
| 90(2) | 90(2) | 10(2) | 90(2) | | 10(2) | 20(2) | 90(2) |
| 10(2) | 10(2) | 90(2) | 10(2) | | 10(2) | 20(2) | 90(2) |
| ⋮ | ⋮ | ⋮ | ⋮ | | ⋮ | ⋮ | ⋮ |
| 90(2) | | | | | | | |
| ⋮ | ⋮ | ⋮ | ⋮ | | ⋮ | ⋮ | ⋮ |
| 90(4) | 10(4) | 90(4) | 10(4) | | 10(4) | 20(4) | 90(4) |

13421, 13422, 13423, 13424, 13425, 13426

JOB OPERATING TIME PERIOD RANGE WIDTH MANAGEMENT TABLE 1343

| PACKAGE | MPPK1 | |
|---|---|---|
| PROCESSING TYPE | JOB OPERATING RATE | RANGE WIDTH |
| SYNCHRONOUS PROCESSING | 90 | 64 |
| ASYNCHRONOUS PROCESSING | 10 | |
| CACHE DIRTY RATE | 10 | |
| ... | ... | ... |
| SYNCHRONOUS PROCESSING | 10 | 64 |
| ASYNCHRONOUS PROCESSING | 90 | |
| CACHE DIRTY RATE | 90 | |

Fig. 13

JOB OPERATING TIME PERIOD MANAGEMENT TABLE 1344

| PACKAGE | MPPK1 | | | | |
|---|---|---|---|---|---|
| MP | TYPE | PROCESSING START TIME 1 | OPERABLE TIME PERIOD 1 | PROCESSING START TIME 2 | OPERABLE TIME PERIOD 2 |
| MP1 | SYNCHRONOUS PROCESSING | 12:00:00.000 | 0.040 | --- | --- |
| | SYNCHRONOUS PROCESSING | 12:00:00.048 | 0.016 | --- | --- |
| | INTENSIVE WRITING PROCESSING | 12:00:00.048 | 0.016 | --- | --- |
| MP2 | SYNCHRONOUS PROCESSING | 12:00:00.016 | 0.160 | --- | --- |
| | SYNCHRONOUS PROCESSING | 12:00:00.000 | 0.016 | --- | --- |
| | INTENSIVE WRITING PROCESSING | 12:00:00.000 | 0.016 | --- | --- |
| ... | ... | ... | ... | ... | ... |
| MP4 | SYNCHRONOUS PROCESSING | 12:00:00.000 | 0.024 | 12:00:00.048 | 0.016 |
| | ASYNCHRONOUS PROCESSING | 12:00:00.032 | 0.016 | 12:00:00.000 | 0.020 |
| | INTENSIVE WRITING PROCESSING | 12:00:00.032 | 0.016 | 12:00:00.000 | 0.020 |

Fig. 14

PERIODIC PROCESSING MANAGEMENT TABLE 1345

| PROCESSING TYPE | NEXT EXECUTION START TIME |
|---|---|
| JOB OPERATING TIME PERIOD REVIEW | 01:00:00 |

CONFIGURATION EXAMPLE OF QUEUE OF MP PROCESSING REQUESTS

MP4

| MP IN CHARGE | COMMAND0 | ADDRESS | DATA LENGTH |
|---|---|---|---|
| MP1 | Write | XXXX | AAAA |
| | Read | YYYY | — |
| | ... | ... | ... |

STORAGE APPARATUS AND METHOD OF CONTROLLING STORAGE APPARATUS

CROSS REFERENCE TO RELATED APPLICATION

This application claims priority to International Application No. PCT/JP2012/003235, filed May 17, 2012 which is incorporated by reference as if fully set forth.

TECHNICAL FIELD

The present invention relates to a storage apparatus and a method of controlling the storage apparatus.

BACKGROUND ART

A storage apparatus which provides a large data storage area by using a large number of storage media such as hard disk drives (hereinafter, HDDs) has been widely used. The storage apparatus provides a data storage area to a host computer (hereinafter, referred to as "host") in which various applications run. In response to data input/output requests (hereinafter, referred to as "data I/O requests") received from the host, the storage apparatus writes data received from the host to the storage media as well as reads data stored in the storage media and sends the data to the host.

The storage apparatus performs data processing which needs to be executed immediately in response to the data I/O request from the host described above (hereinafter, referred to as "synchronous processing") and data processing which can be executed at a timing different from the time of receiving the data I/O request from the host (hereinafter, referred to as "asynchronous processing"). Examples of the synchronous processing include processing of writing write data to a cache memory in response to a data write request from the host and returning a write completion report to the host. On the other hand, examples of the asynchronous processing include data processing such as processing of writing data (dirty data), which has been received from the host and stored in the cache memory but has not been written to a disk yet, to the storage media (hereinafter, referred to as "intensive writing processing") and processing for a setting change request, for example, of the storage apparatus received from a management terminal.

Heretofore, Patent Literature 1, for example, has proposed a configuration of a storage apparatus configured to execute the synchronous processing without delay by including, as processors for executing data, a processor for executing the synchronous processing and a processor for executing the asynchronous processing, separately.

Moreover, Patent Literature 2, for example, has proposed a storage apparatus including multiple processors each capable of executing the synchronous processing and the asynchronous processing. An upper limit value of the execution count of synchronous processing is set for each of the processors and each processor is configured to execute the asynchronous processing while not executing the synchronous processing.

CITATION LIST

Patent Literature

PTL 1: International Patent Application Publication No. WO2010/079535

PTL 2: International Patent Application Publication No. WO2011/158296

SUMMARY OF INVENTION

Technical Problem

However, in the configuration of Patent Literature 1, processing which can be executed by each of the processors is limited to either the synchronous processing or the asynchronous processing. Thus, it is difficult to sufficiently increase the operating rates of the processors and thereby improve the speed and the efficiency of data processing. Moreover, in the configuration of Patent Literature 2, the execution count of the synchronous processing and that of the asynchronous processing by each of the processors are limited. Hence, when the asynchronous processing requiring a long execution time is executed, the synchronous processing may have to wait until a timing at which the synchronous processing can be executed next. Moreover, execution timings of the synchronous processing and the asynchronous processing of the processors are not controlled. Hence, the configuration of Patent Literature 2 has a problem that there is a time slot in which none of the multiple processors can execute the synchronous processing.

The present invention has been made to solve the problems described above and other problems. A main object of the present invention is to provide a storage apparatus capable of improving a response to a host I/O request and a method of controlling the storage apparatus.

Solution to Problem

An aspect of the present invention for achieving the aforementioned object provides a storage apparatus including a storage medium for providing an external apparatus with a data storage area. The storage apparatus includes a processing unit including multiple processors which execute synchronous processing and asynchronous processing other than the synchronous processing, the synchronous processing being processing to be executed immediately in response to data I/O requests from the external apparatus, the asynchronous processing being processing to be executed as needed in response to a processing request generated in the storage apparatus, a temporary storage unit which provides a storage area where any of the processors temporarily stores write target data in accordance with a data write request among the data I/O requests, and a processor operating rate management part which manages a time schedule for each of the multiple processors to execute the synchronous processing or the asynchronous processing. In the storage apparatus, the processor operating rate management part acquires execution proportions of the synchronous processing and the asynchronous processing executed by each of the multiple processors in a past predetermined time period and an usage state of the temporary storage unit used by the multiple processors, compares the acquired execution proportions and the usage state with execution proportions of the synchronous processing, the asynchronous processing, and intensive writing processing set in advance for each of the processors, the intensive writing processing being processing of writing from the temporary storage unit to the storage medium, the execution proportion of the intensive writing processing defined corresponding to the usage state of the temporary storage unit, and sets an operation schedule of the multiple processors in such a way that at least one of the processors executes the synchronous processing at any point in a predetermined execution proportion management unit time.

In addition, another aspect of the present invention for achieving the aforementioned object provides a method of controlling a storage apparatus including a storage medium for providing an external apparatus with a data storage area. The storage apparatus includes a processing unit including multiple processors which execute synchronous processing and asynchronous processing other than the synchronous processing, the synchronous processing being processing to be executed immediately in response to data I/O requests from the external apparatus, the asynchronous processing being processing to be executed as needed in response to a processing request generated in the storage apparatus, a temporary storage unit which provides a storage area where any of the processors temporarily stores write target data in accordance with a data write request among the data I/O requests, and a processor operating rate management part which manages a time schedule for each of the multiple processors to execute the synchronous processing or the asynchronous processing. The method includes the steps, executed by the processor operating rate management part, of acquiring execution proportions of the synchronous processing and the asynchronous processing executed by each of the multiple processors in a past predetermined time period and an usage state of the temporary storage unit used by the multiple processors; comparing the acquired execution proportions and the usage state with execution proportions of the synchronous processing, the asynchronous processing, and intensive writing processing set in advance for each of the processors, the intensive writing processing being processing of writing from the temporary storage unit to the storage medium, the execution proportion of the intensive writing processing defined corresponding to the usage state of the temporary storage unit, and setting an operation schedule of the multiple processors in such a way that at least one of the processors executes the synchronous processing at any point in a predetermined execution proportion management unit time.

In addition, problems and a method for solving the problems disclosed in this application will be made clear by the section of an embodiment and the drawings.

Advantageous Effects of Invention

The present invention can provide a storage apparatus capable of improving a response to a host I/O request and a method of controlling the storage apparatus.

BRIEF DESCRIPTION OF DRAWINGS

FIG. 9 is a table showing an example of an MP operating rate management table 1340.

FIG. 10 is a table showing an example of a cache dirty ratio table 1341.

FIG. 11 is a table showing an example of a job operating time period tuning table 1342.

FIG. 13 is a table showing an example of a job operating time period management table 1344.

FIG. 14 is a table showing an example of a periodic processing management table 1345.

FIG. 15 is a configuration example of a queue of MP processing requests stored in the cache memory package device 120.

DESCRIPTION OF EMBODIMENTS

Configuration of Storage System 1

Figure 1:
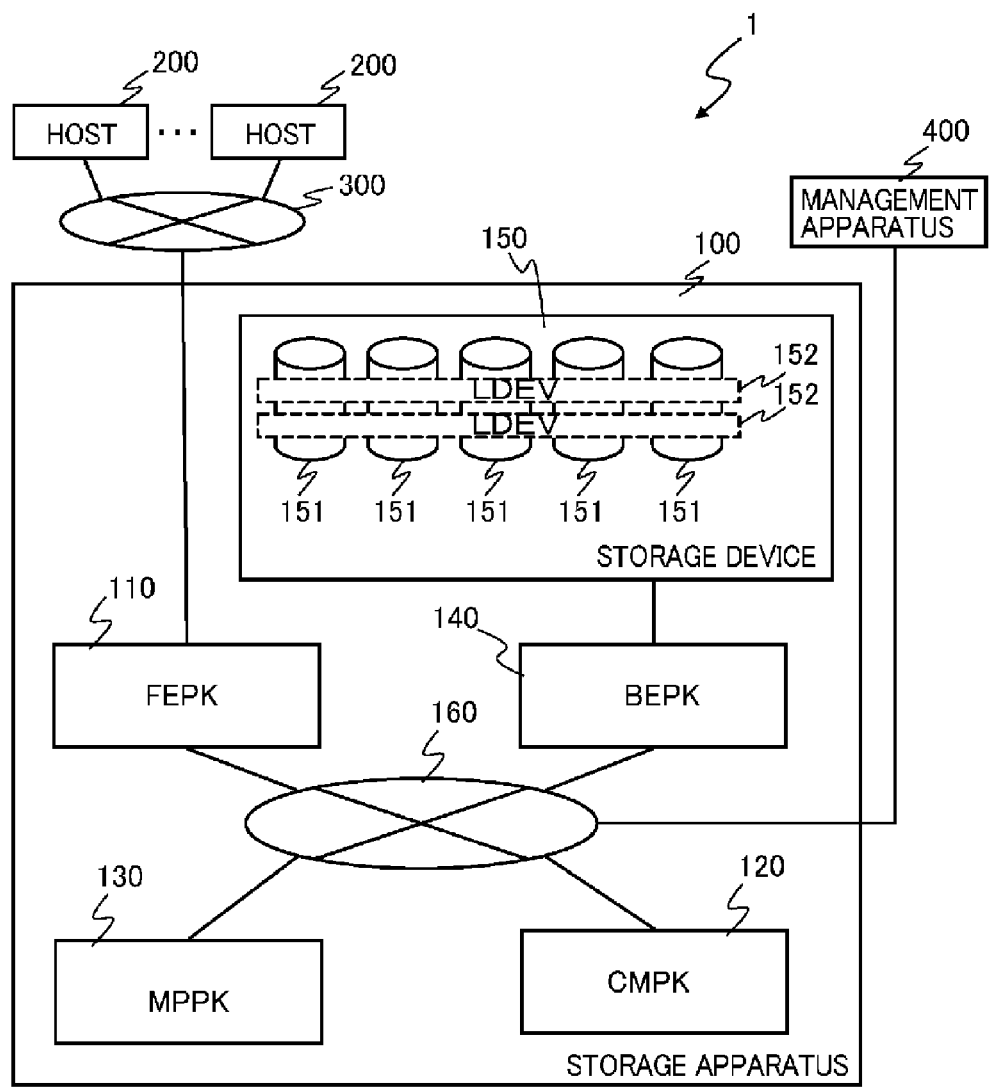
FIG. 1 is a diagram showing a schematic configuration of a storage system 1.

An embodiment of the present invention is described below with reference to the ac-companying drawings. FIG. 1 shows a schematic configuration of a storage system 1 to be described as the embodiment. As shown in FIG. 1, one or more host computers 200 (hereinafter, referred to as "hosts 200") which are external apparatuses are coupled to a storage apparatus 100 through a communication network 300 in the storage system 1. Note that, although the single storage apparatus 100 is shown in an example of FIG. 1, another one or more storage apparatuses 100 may be coupled to the communication network 300.

The communication network 300 is a LAN (Local Area Network), a WAN (Wide Area Network), a SAN (Storage Area Network), the Internet, a public communication network, a lease line or the like. The communication through the communication network 300 is performed in accordance with a protocol such as TCP/IP, iSCSI (internet Small Computer System Interface) or Fibre Channel Protocol.

Each of the hosts 200 is an information apparatus (a computer) using a storage area (a data storage area) provided by the storage apparatus 100. The host 200 is configured by using a personal computer, a mainframe, an office computer or the like. When accessing the storage area, the host 200 sends the storage apparatus 100 a data frame (hereinafter, shortened as a frame) including a data I/O request (a data write request, a data read request or the like).

The storage apparatus 100 is, for example, a disk array apparatus. The storage apparatus 100 accesses storage media in response to the aforementioned I/O request transmitted from the host 200 and transmits data or a response to the host 200. The storage apparatus 100 includes one or more front-end package devices (FEPK) 110, a cache memory package device (CMPK) 120, a microprocessor package device (MPPK) 130 (a processing unit), one or more back-end package devices (BEPK) 140, and a storage device 150. Note that the term "package" is used to refer to a single assembly as hardware and the hardware may be achieved by any specific configuration such as a circuit board.

Figure 2:
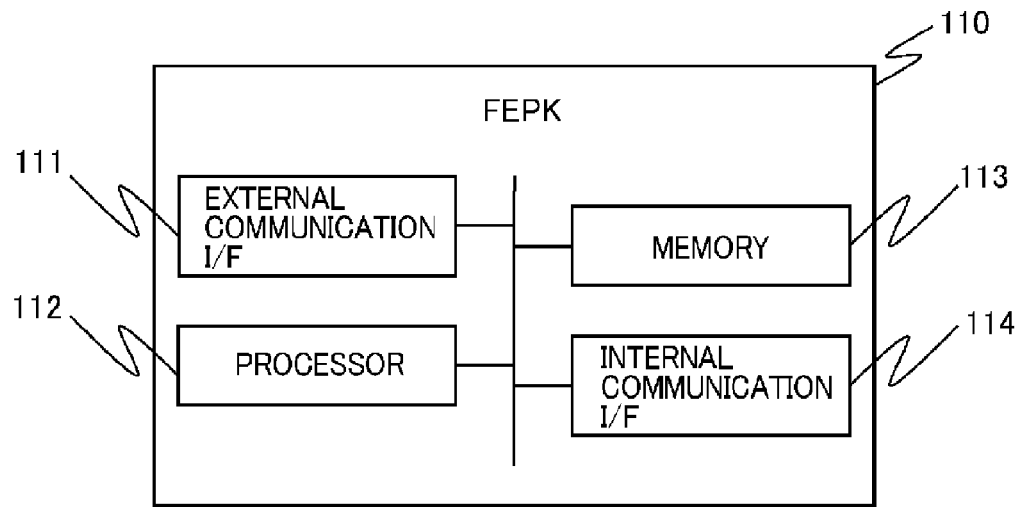
FIG. 2 is an example of a hardware configuration of a front-end package device 110.

The FEPK 110 receives a frame sent from the host 200, and sends the host 200 a frame including a response (for example, read data, a read completion report or a write completion report) concerning processing for a data I/O request included in the received frame. Note that the description is given below on the assumption that a frame is a frame of a fibre channel (FC frame). FIG. 2 shows an example of a hardware configuration of the FEPK 110. As shown in FIG. 2, the FEPK 110 includes an external communication interface (hereinafter, "external communication I/F") 111 having a port (a communication port) for communication with the host 200 and an internal communication interface (hereinafter, an "internal communication I/F") 114 having a port (a communication port) for communication with a processor 112, a local memory 113, and the like.

The external communication I/F 111 is configured by using an NIC (Network Interface Card), an HBA (Host Bus Adaptor), or the like according to the type of the coupled communication network 300. The processor 112 is configured by using a CPU (Central Processing Unit), an MPU (Micro Processing Unit) or the like. The local memory 113 is a RAM (Random Access Memory), a ROM (Read Only Memory), or the like. The local memory 113 stores a micro program for implementing the function of the FEPK 110. The processor 112 reads, from the local memory 113, and executes the aforementioned micro program to implement various functions provided by the FEPK 110. The internal communication I/F 114 communicates with the CMPK 120 and the like through an internal communication path. For example, a PCI express (PCIe) (trademark) is used as the internal communication I/F.

Figure 3:
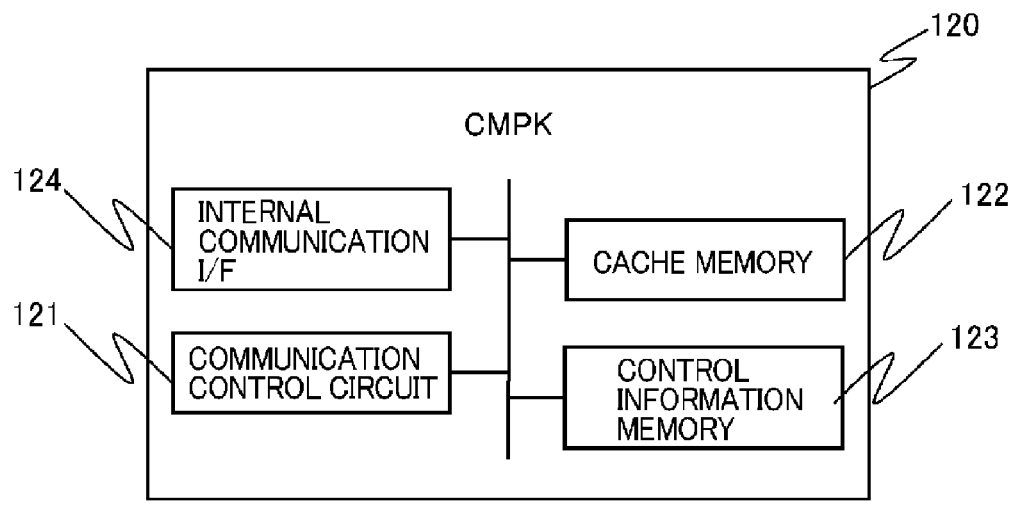
FIG. 3 is an example of a hardware configuration of a cache memory package device 120.

As shown in FIG. 3, the CMPK 120 includes a communication control circuit 121 configured to control data transfer processing in the storage apparatus 100, a cache memory 122, a control information memory 123, and an internal communication I/F 124. The communication control circuit 121 is communicably coupled to the FEPK 110, the MPPK 130, and the BEPK 140 through the internal communication I/F 124, and controls data transfer processing to be executed between these components. Specifically, the communication control circuit 121 performs: exchange of data (data read from the storage device 150 and data to be written to the storage device 150) between the FEPK 110 and the BEPK 140; and staging (reading data from the storage device 150) of data to be stored in the cache memory 122 or destaging (writing data to the storage device 150); and the like, for example. The cache memory 122 is a storage device used as a temporary storage area for data exchanged between the host 200 and the storage device 150 in response to processing for the data write or data read request from the host 200. The control information memory 123 is a storage device for storing data such as communication control parameter which the communication control circuit 121 uses.

Figure 4:
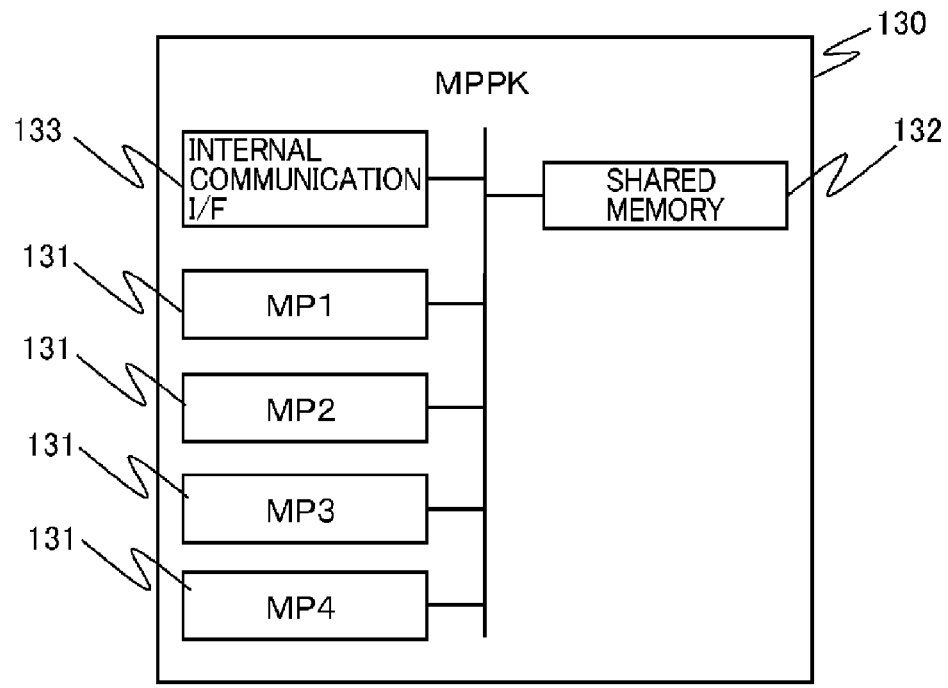
FIG. 4 is an example of a hardware configuration of a microprocessor package device 130.

The MPPK 130 performs processing for the data I/O request between the FEPK 110 and the BEPK 140 in response to the data I/O request included in a frame received by the FEPK 110. FIG. 4 shows an example of a hardware configuration of the MPPK 130. The MPPK 130 includes multiple microprocessors (hereinafter "MPs") 131, a shared memory 132, and an internal communication I/F 133. In the embodiment, four MPs 131 are provided in the single package. The MPs 131 share processing for requests for data write to or data read from logical volumes assigned to the host 200 as logical storage areas. In addition, a representative one of the MPs 131 which is selected in advance executes data processing necessary for the storage apparatus 100, such as failover processing to be performed in a case of a failure in any MP 131. The shared memory 132 stores a program for implementing a function to be executed by the MPs 131. The internal communication I/F 133 communicates with the communication control circuit 121 of the CMPK 120 through an internal communication path.

Figure 5:
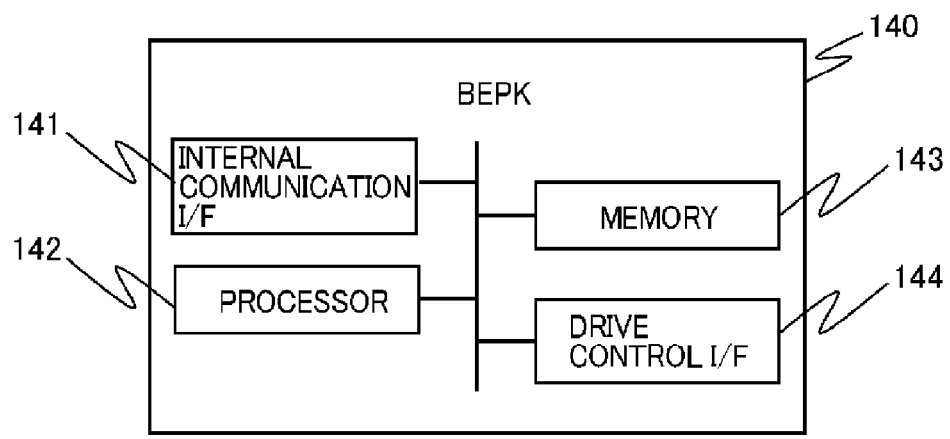
FIG. 5 is an example of a hardware configuration of a back-end package device 140.

The BEPK 140 communicates with the storage device 150 in reading data from the storage device 150 and in writing data to the storage device 150. FIG. 5 shows an example of a hardware configuration of the BEPK 140. The BEPK 140 includes an internal communication I/F 141, a processor 142, a local memory 143, and a drive control interface (hereinafter, a "drive control I/F") 144. The local memory 143 stores a micro program. The processor 142 reads, from the local memory 143, and executes the aforementioned micro program to implement various functions including disk control which are provided by the BEPK 140. The internal communication I/F 141 communicates with the communication control circuit 121 of the CMPK 120 through an internal communication path. The processor 142 is configured by using a CPU, an MPU or the like. The local memory 143 is a RAM or ROM, for example. The drive control I/F 144 communicates with the storage device 150 by using a predetermined interface such as a SAS.

The storage device 150 includes multiple storage drives 151. Each of the storage drives 151 is an HDD of, for example, a SAS type. The storage drive 151 can also be configured by an HDD of another type such as SATA (Serial ATA), FC (Fibre Channel), PATA (Parallel ATA) or SCSI, or by a semiconductor storage device (Solid State Drive, hereinafter "SSD"). Note that the FEPK 110, the CMPK 120, the MPPK 130, the BEPK 140, and the storage device 150 are generally provided in two or more sets to provide a configuration redundancy of the storage apparatus 100.

The storage device 150 provides storage areas in units of logical storage areas provided by controlling the storage drives 151 in accordance with a method such as RAID (Redundant Arrays of Inexpensive (or Independent) Disks). Each of the logical storage areas is a logical device (LDEV) 152 configured by using, for example, a RAID group (a parity group). The storage apparatus 100 also provides the host 200 with logical volumes configured by using the LDEVs 152. The storage apparatus 100 manages correspondence (a relationship) between the logical volumes and the LDEVs 152. Based on the correspondence, the storage apparatus 100 identifies a LDEV 152 corresponding to the logical volume or a logical volume corresponding to the LDEV 152.

Figure 6:
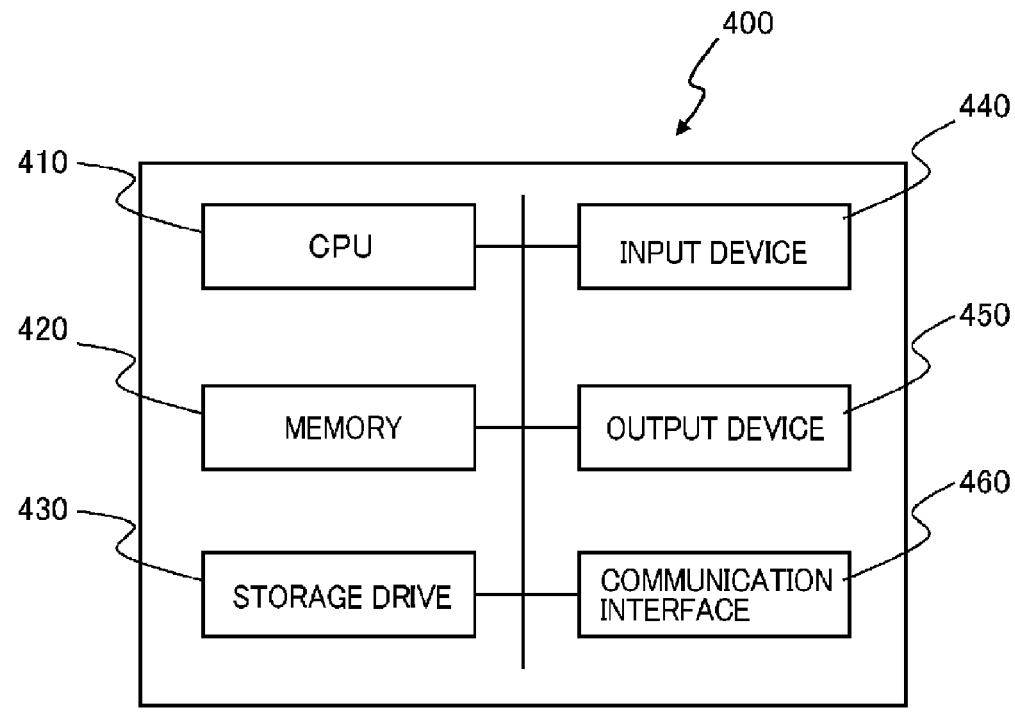
FIG. 6 is an example of a hardware configuration of a management apparatus 400.

A management apparatus 400 is a computer configured to communicate with the components of the storage apparatus 100 such as the FEPK 110, the CMPK 120, the MPPK 130, and the BEPK 140 as needed through an internal communication network 160 of the storage apparatus 100 to execute initial setting, manipulation inputting, monitoring of an operation state of the storage apparatus 100, and the like. FIG. 6 shows a hardware configuration example of the management apparatus 400. As illustrated in FIG. 6, the management apparatus 400 includes a CPU 410, a memory 420, a storage drive 430, an input device 440, an output device 450, and a communication interface 460.

The CPU 410 may be a CPU or another arithmetic operation device such as an MPU. The memory 420 is a memory which stores data such as various programs for implementing a function as the management apparatus 400, parameters used during execution of the programs, and various tables. The memory 420 is configured by a memory device such as a ROM, a RAM or a flash memory. The storage drive 430 is a secondary storage and can be configured by an appropriate storage device including an HDD, an SSD, and the like. The input device 440 is a data input device used in a general computer and can include an appropriate input device selected from, for example, a keyboard, a mouse, a touch screen, a pen tablet, and the like. The output device 450 is a data output device used in a general computer and can include an appropriate output device such as a display monitor and a printer. The communication interface 460 is an interface circuit such as an NIC.

Figure 7:
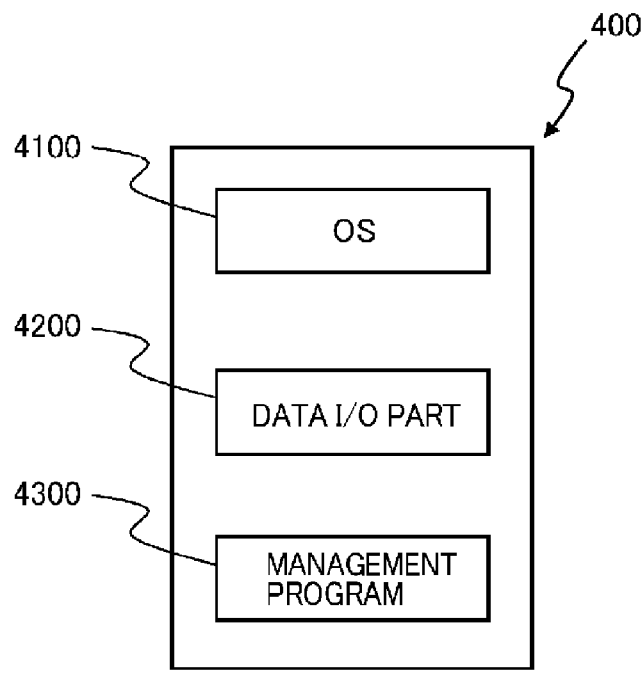
FIG. 7 is an example of a software configuration of the management apparatus 400.

FIG. 7 shows a software configuration example of the management apparatus 400. As shown in FIG. 7, the management apparatus 400 includes an operating system (OS) 4100, a data I/O part 4200, and a management program 4300. The OS 4100 is basic software which is an execution base for the various programs executed in the management apparatus 400. One of various OSs generally used as an OS of a computer can be selected and used as the OS 4100. The data I/O part 4200 is a program that manages, under control of the OS 4100, processing of data input/output (data I/O) from/to each program running on the management apparatus 400. The management program 4300 is an application program for implementing the function as the management apparatus 400.

Figure 8:
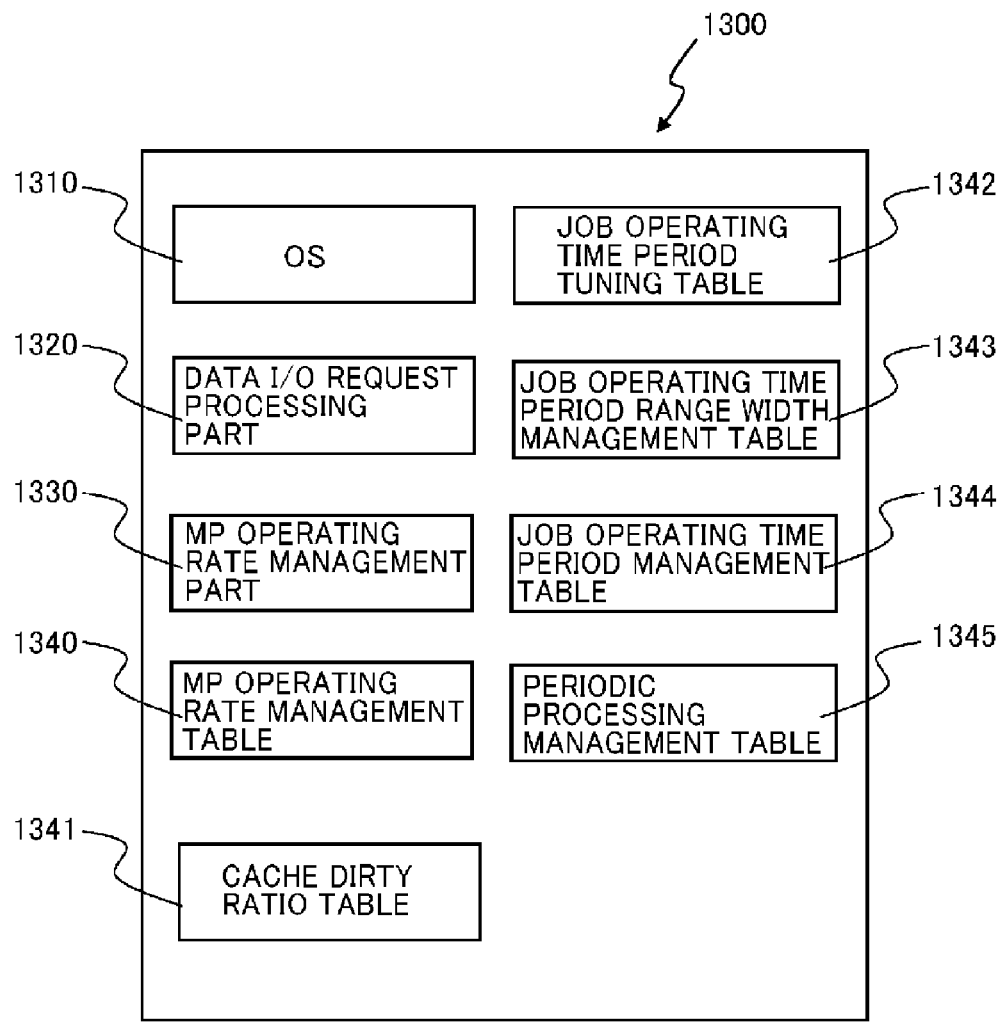
FIG. 8 is an example of a software configuration of a storage apparatus 100.

Next, a description is given of a configuration of software executed by the MPs 131 of the storage apparatus 100 of the embodiment. FIG. 8 shows a configuration example of the software executed by the MPs 131 together with tables storing parameters and the like used when the MPs 131 execute the software. The software and the tables are stored in the shared memory 132 of the MPPK 130 and are executed or used by the MPs 131, for example. An OS 1310 is basic software which is an execution base for the various programs executed in the storage apparatus 100. One of various OSs generally used as an OS of a computer can be selected and used as the OS 1310. A data I/O request processing part 1320 executes data processing such as processing for data I/O request sent from the host 200, processing for data I/O between the storage device 150 and the cache memory 122, and processing for various settings executed in accordance with instructions from the management apparatus 400, under the control of the OS 1310.

An MP operating rate management part 1330 is a main function of the embodiment and manages an execution schedule of synchronous processing and asynchronous processing performed by each of the MPs 131 provided in the MPPK 130. Functions and operations of the MP operating rate management part 1330 will be described later. Parameters and the like which the MP operating rate management part 1330 uses to manage the schedule of MP execution processing are recorded in a MP operating rate management table 1340, a cache dirty ratio table 1341, a job operating time period tuning table 1342, a job operating time period range width management table 1343, a job operating time period management table 1344, and a periodic processing management table 1345.

FIG. 9 shows a configuration example of the MP operating rate management table 1340. The MP operating rate management table 1340 records, for each of the types of data processing, the proportion at which each of the MPs 131 provided in the MPPKs 130 has executed the data processing in a past certain time period (for example, the latest 500 ms). The MP operating rate management table 1340 records items of a package ID 13401, an MP ID 13402, and a processing-type-based operating rate 13403. The package ID 13401 records an identification code indicating the MPPK 130 on which the table records information. The MP ID 13402 records identification codes for identifying the MPs 131 provided in the package ID 13401 from each other. The processing-type-based operating rate 13403 records operating rates of the MPPK 130 identified from the package ID 13401 or of the MPs 131 identified from the MP ID 13402 in the past certain time period, based on the types of processing. The MP operating rate management table 1340 illustrated in FIG. 9 is created for the MPPK 130 identified from MPPK1 and shows that an overall operating rate of the MPPK 130 in the past certain time period is 80%. Moreover, for example, in the MP1 mounted on the MPPK1, the synchronous processing and the asynchronous processing are executed at proportions of 70% and 30%, respectively, and the proportion of intensive writing processing to the asynchronous processing is 50% in the past certain time period.

Next, FIG. 10 shows a configuration example of the cache dirty ratio table 1341. The cache dirty ratio table 1341 shows how much dirty data exists on the cache memory 122 by a proportion to the total storage capacity of the cache memory 122, the dirty data being data which is stored in the cache memory 122 in response to the data write request from the host 200 but is not stored in the storage device 150 yet. The example of FIG. 10 shows that the dirty data occupies 50% of the total storage capacity of the cache memory 122. As the occupation proportion of the dirty data becomes larger, the hit rate of the cache memory 122 becomes smaller and the response to the host I/O request deteriorates. Accordingly, a time period in which the MPs 131 are allocated to the intensive writing processing in the asynchronous processing is required to be made longer as the amount of dirty data on the cache memory 122 becomes larger. The cache dirty ratio table 1341 is used as a parameter for managing the time period in which each of the MPs 131 is allocated to the intensive writing processing.

Next, FIG. 11 shows a configuration example of the job operating time period tuning table 1342. The job operating time period tuning table 1342 is a table which previously defines, for each of the MPs 131 in the MPPK 130, proportions at which the synchronous processing, the asynchronous processing, and the intensive writing processing are to be executed. As will be described later, the MP operating rate management part 1330 of the storage apparatus 100 acquires an operation state of each MP 131 and the cache dirty ratio in the past certain time period and calculates time periods in which the MP 131 can operate for the synchronous processing, the asynchronous processing, and the intensive writing processing, respectively, by referring to the job operating time period tuning table 1342. The job operating time period tuning table 1342 shown in FIG. 11 records items of a package ID 13421, a synchronous processing operating rate 13422, an asynchronous processing operating rate 13423, a synchronous processing operating proportion 13424, an asynchronous processing operating proportion 13425, and an intensive writing processing operating proportion 13426. The package ID 13421 records an identification code indicating one of the MPPKs 130 of the storage apparatus 100 on which the table records information. The synchronous processing operating rate 13422 records values each indicating the proportion of a job of the synchronous processing which a corresponding one of the MPs 131 mounted on the MPPK1 executes. The asynchronous processing operating rate 13423 records values each indicating the proportion of a job of the asynchronous processing which a corresponding one of the MPs 131 mounted on the MPPK1 executes. The synchronous processing operating proportion 13424 records values each indicating the proportion of a time period in which a corresponding one of the MPs 131 mounted on the MPPK1 can execute the job of the synchronous processing. The asynchronous processing operating proportion 13425 records values each indicating the proportion of a time period in which a corresponding one of the MPs 131 mounted on the MPPK1 can execute the job of the asynchronous processing. The intensive writing processing operating proportion 13426 records values each indicating the proportion of a time period in which a corresponding one of the MPs 131 mounted on the MPPK1 can execute a job of the intensive writing processing. Since the intensive writing processing is one type of the asynchronous processing, the intensive writing processing operating proportion 13426 is recorded as a proportion in the asynchronous processing operating proportion 13425. Moreover, as described above regarding the cache dirty ratio table 1341, a longer execution time is required for the intensive writing processing as the cache dirty ratio becomes larger. Thus, the items of the intensive writing processing operating proportion 13426 are recorded with the cache dirty ratio being a parameter. Since the items of the synchronous processing operating rate 13422 to the intensive writing processing operating proportion 13426 are recorded for each of the MPs 131, the recorded values of the MPs 131 identified as the MP1 to MP4 are recorded to be identified from each other by parenthesized numbers, in such a way that (1) is used for the MP1 and (2) is used for the MP2.

Figure 12:
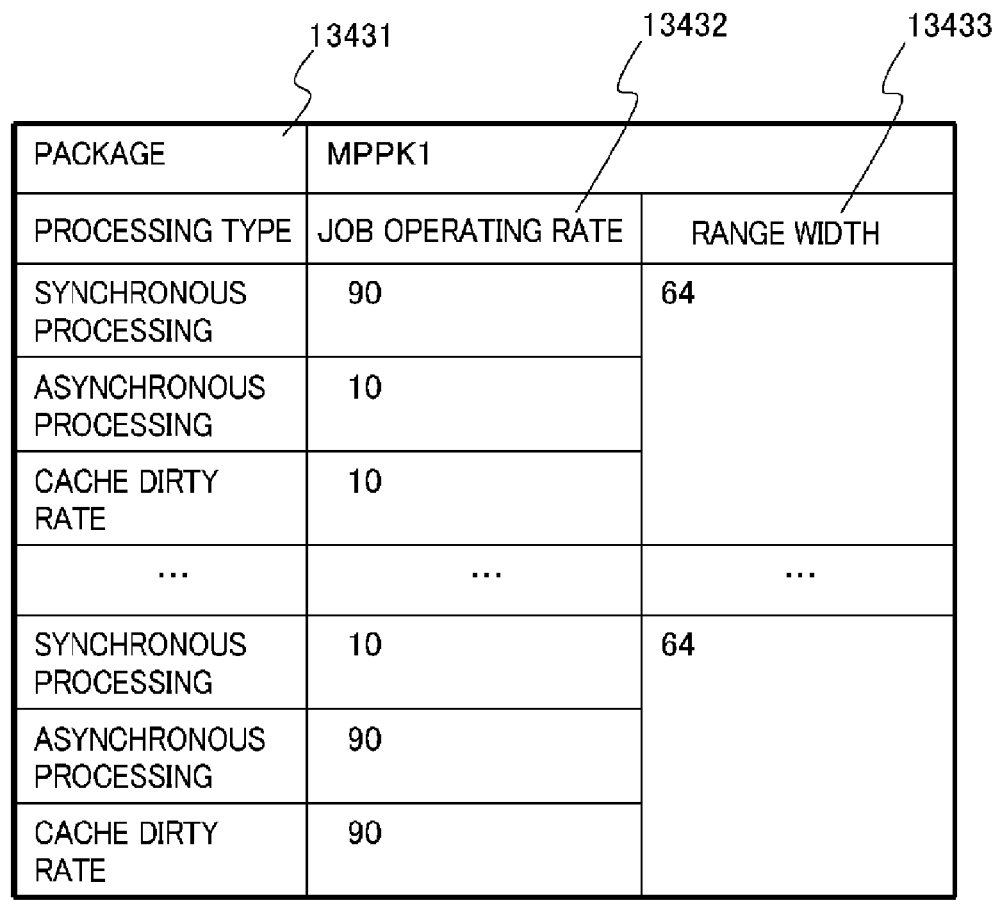
FIG. 12 is a table showing an example of a job operating time period range width management table 1343.

Next, FIG. 12 shows a configuration example of the job operating time period range width management table 1343. The job operating time period range width management table 1343 defines the length of a unit time determining processing execution schedule of the MPs 131 in association with the proportions of the synchronous processing and the asynchronous processing executed in the past certain time period by the MPs 131 (for example, MP1 to MP4) operating in the MPPK 130 and the cache dirty ratio of the cache memory 122 used by the MPPK 130. In the embodiment, this unit time is referred to as "range width" (execution proportion management unit time). The job operating time period range width management table 1343 records items of a package ID 13431, a job operating rate 13432, and a range width 13433 for each of the MPs 131 mounted on the MPPK 130. The package ID 13431 records an identification code indicating one of the MPPKs 130 of the storage apparatus 100 on which the table records information.

The job operating rate 13432 records the proportion at which the MPs 131 mounted on the MPPK 130 have executed the synchronous processing as a whole and the proportion at which the MPs 131 have executed the asynchronous processing as a whole. The cache dirty ratio shows the proportion of the size of the dirty data to the storage capacity of the cache memory 122 used by the MPPK 130. The range width 13433 records the length of the unit time determining the processing execution schedule of each MP 131 as described above. The MP operating rate management part 1330 of the storage apparatus 100 acquires the range width 13433 for each MPPK 130 on the basis of the processing execution state in the target MPPK 130. The relationship among the job operating rate 13432, the cache dirty ratio, and the range width 13433 can be set as appropriate. In the embodiment, since four MPs 131 are mounted on the MPPK 130, a synchronous/asynchronous processing allocation unit for each MP 131, which will be described later, is set to 16 ms and the range width 13433 is thus set to 16×4=64 ms. The following idea or the like is conceivable as an idea of setting the range width 13433. For example, when the operating rate of the synchronous processing is relatively high, the range width 13433 is set to be longer in such a way that a continuous time slot is secured for synchronous processing within a single range width.

Next, FIG. 13 shows a configuration example of the job operating time period management table 1344. The job operating time period management table 1344 is a table for managing, for each MPPK 130, the operating time periods of the respective jobs of the synchronous processing, the asynchronous processing, and the intensive writing processing executed by the MPs 131 mounted on the MPPK 130. By creating the job operating time period management table 1344, one or more of the MPs 131 mounted on each MPPK 130 can execute the synchronous processing at all times. The job operating time period management table 1344 illustrated in FIG. 13 includes items of a package ID 13441, an MP ID 13442, a processing type 13443, a processing start time 13444, and an operable time period 13445. The package ID 13441 records an identification code for identifying the MPPK 130 being the target of the processing execution schedule setting. The MP ID 13442 records identification codes for identifying the MPs 131 mounted on the target MPPK 130 from each other. The processing type 13443 records types including the synchronous processing, the asynchronous processing, and the intensive writing processing which are executed by the MPs 131. The processing start time 13444 records times being the start points of time slots in which the MPs 131 can execute the synchronous processing, the asynchronous processing, and the intensive writing processing. The operable time period 13445 records the lengths of the time slots in which the synchronous processing, the asynchronous processing and the intensive writing processing can be executed with times of the processing start time 13444 being the starting points. The processing start time 13444 records the times at which each MP 131 can start the synchronous processing, the asynchronous processing, and the intensive writing processing, in units of milliseconds. The operable time period 13445 records the lengths of the time slots in which each MP 131 can execute the synchronous processing, the asynchronous processing, and the intensive writing processing, also in units of milliseconds. A set of two processing start times 13444 and a set of two operable time periods 13445 are set in consideration of the case where the synchronous processing, the asynchronous processing, and the intensive writing processing are not completed within the respective operable time periods assigned to each of the MPs 131 with the range width being the same. The processing start times and the operable time periods are identified by being referred to as processing start times 1 and 2 and operable time periods 1 and 2. Note that, although the configuration example of FIG. 13 corresponds to an MP operating time schedule described later in relation to FIG. 22, the recorded contents illustrated in FIGS. 13 and 22 do not limit the present invention at all.

Next, FIG. 14 shows a configuration example of the periodic processing management table 1345. The periodic processing management table 1345 is a table managing processing to be periodically executed by any of the MPs 131 (for example, the representative MP) mounted on the MPPK 130. The periodic processing management table 1345 records items of a processing type 13451 and a next execution start time 13452. The processing type 13451 records the type of processing to be periodically executed by any of the MPs 131. In the embodiment, processing to be periodically executed includes job operating time period review processing. The job operating time period review processing is processing in which the setting contents of the job operating time period management table 1344 of FIG. 13 are regularly updated based on data recorded in the MP operating rate management table 1340 of FIG. 9, the cache dirty ratio table 1341 of FIG. 10, the job operating time period tuning table 1342 of FIG. 11, and the job operating time period range width management table 1343 of FIG. 12. A specific processing flow of the job operating time period review processing will be described later. Note that other examples of periodic processing include processing of regularly acquiring configuration information and an operating state of the storage apparatus 100. The time at which the next execution of the periodic processing specified in the processing type 13451 is to be started is recorded in the next execution start time 13452 in units of milliseconds.

Next, a description is given of a queue of data processing requests to be processed by each of the MPs 131 in the MPPK 130. The host 200 sends the storage apparatus 100 data I/O requests including data write requests and data read requests through the FEPK 110. The data I/O requests include the synchronous processing for which a response needs to be returned quickly to the host 200 and the asynchronous processing such as a disk I/O request generated upon the data I/O request from the host 200. The MPs 131 of the MPPK 130 each store these data I/O requests as a queue in the shared memory 132 provided in the MPPK 130. FIG. 15 shows a configuration example of the MP processing request queues. For example, each processing request queue includes an MP in charge, a command to be executed, an execution target address, and a data length of a processing target, but may include items other than these as appropriate. The top row of the example in FIG. 15 shows a processing request requesting the MP1 of the four MPs 131 mounted on the MPPK 130 to perform write processing on data having a data length of AAAA from a start address XXXX of a corresponding logical volume. Each MP 131 notifies the representative MP whether the processing request which the MP 131 itself is to execute is the synchronous processing or the asynchronous processing, for example, for each processing execution, so that the representative MP can record the contents of the MP operating rate management table 1340.

Next, a description is given of data I/O processing on the storage device 150 which is executed by the storage apparatus 100 having the above-described configuration. The data I/O processing is general processing executed by the storage apparatus 100 illustrated in FIG. 1.

Figure 16:
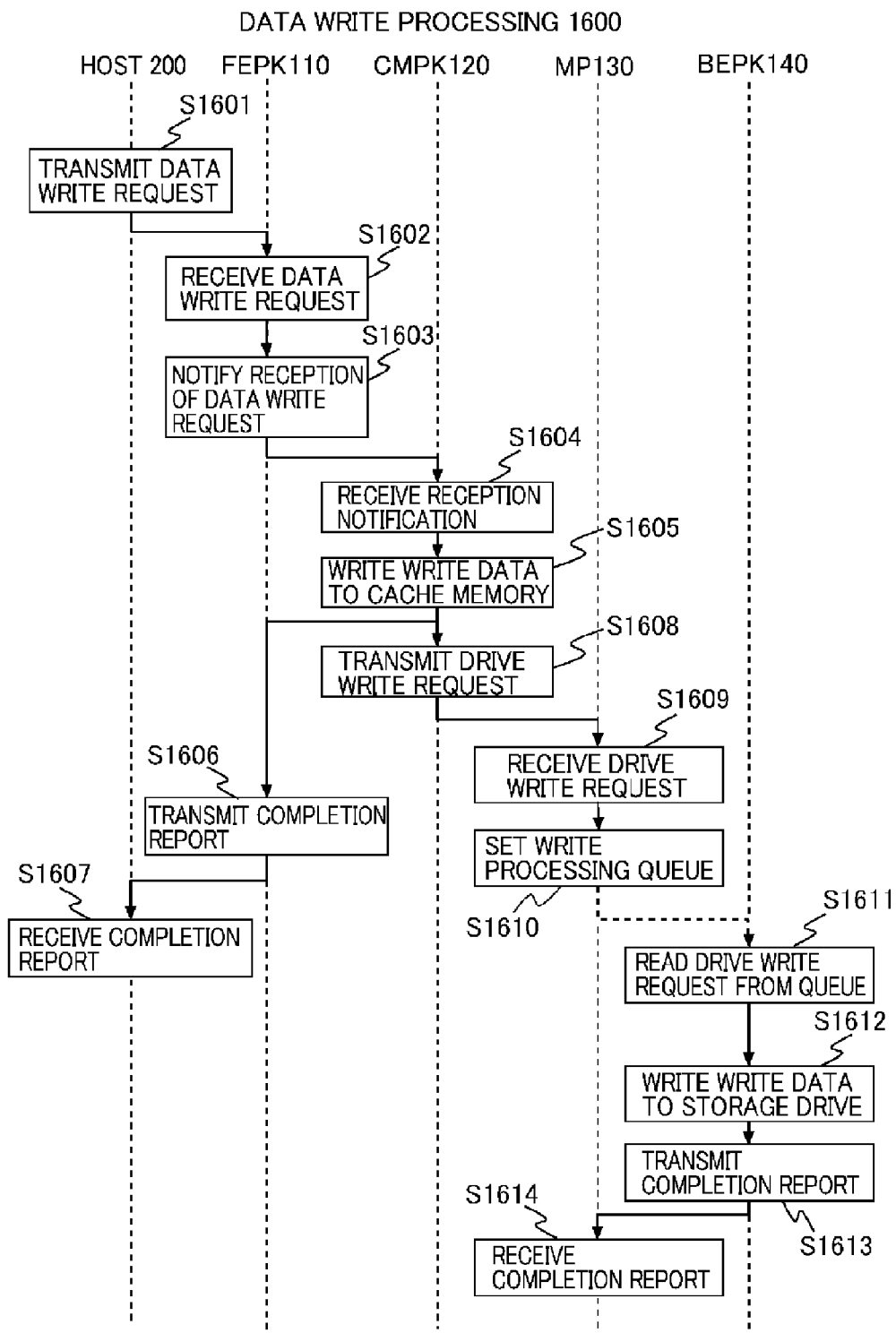
FIG. 16 is a flowchart showing an example of a data write processing flow.

FIG. 16 is a flowchart for explaining processing (hereinafter, "data write processing 1600") executed in a case where the storage apparatus 100 receives a frame including a data write request from one of the hosts 200. The data write processing 1600 will be described below with reference to FIG. 16. Note that, in the following description, a letter "S" prefixed to a code means a step.

The FEPK 110 of the storage apparatus 100 receives the frame transmitted from the host 200 (S1601 and S1602). Upon receipt of the frame, the FEPK 110 notifies the CMPK 120 to that effect (S1603).

Upon receipt of the notification from the FEPK 110 (S1604), the CMPK 120 generates a drive write request in response to the data write request in the frame and stores the generated drive write request in the cache memory 122. The communication control circuit 121 of the CMPK 120 transmits the generated drive write request to one of the MPs 131 which is in charge of the processing (S1608). The FEPK 110 transmits a completion report to the host 200 (S1606), and the host 200 receives the completion report (S1607).

Upon receipt of the drive write request, the MP 131 registers the drive write request in its processing request queue (S1609 and S1610). The BEPK 140 reads drive write requests from the processing request queues whenever necessary (S1611). The BEPK 140 reads write data designated in the thus read drive write request from the cache memory 122 and writes the thus read write data to a corresponding one of the storage drives 151 (S1612).

Next, the BEPK 140 notifies the MP 131 of a report (a completion report) to the effect that write of the write data in response to the drive write request is completed (S1613), and the MP 131 receives the transmitted completion report (S1614).

Figure 17:
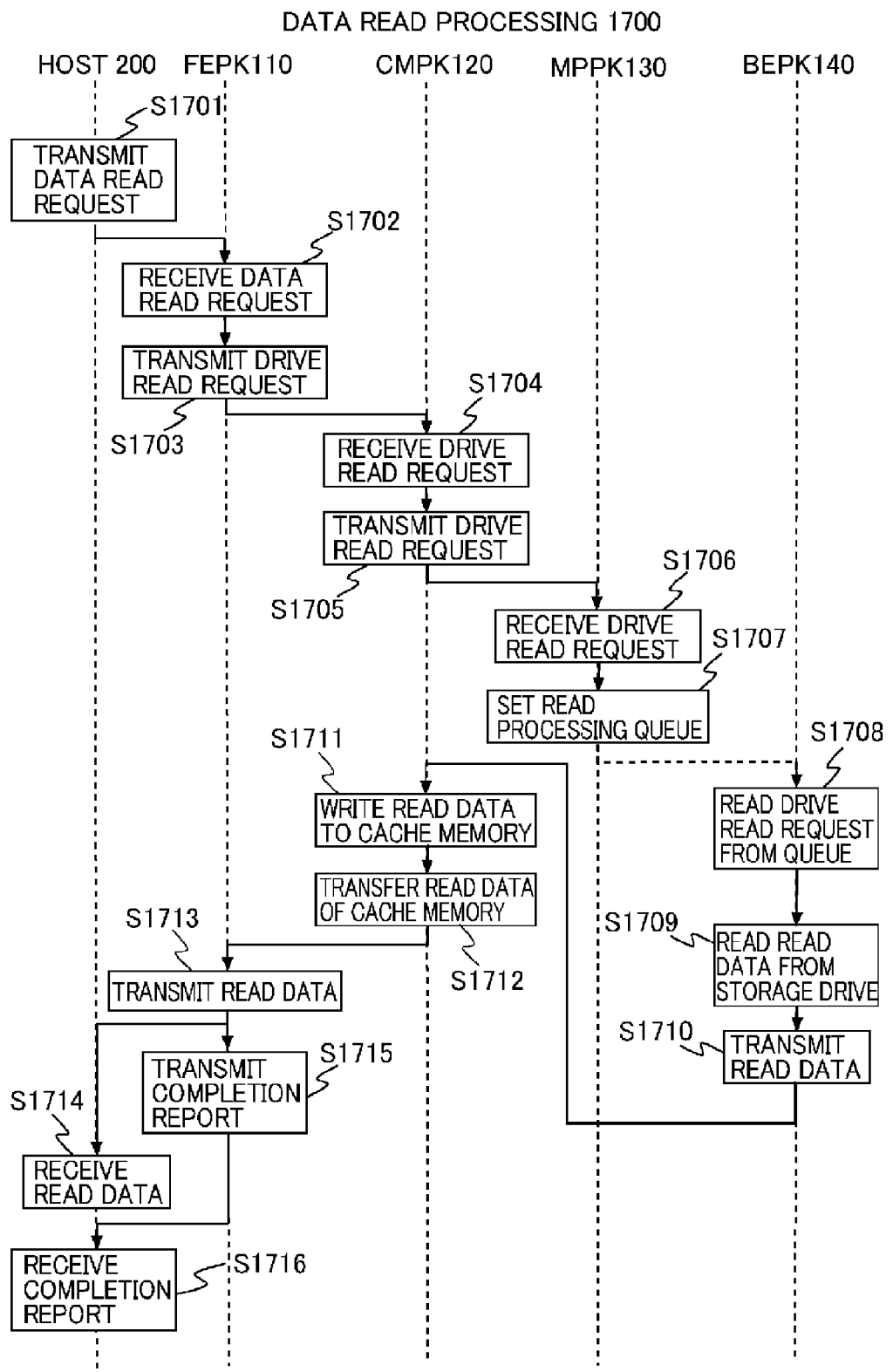
FIG. 17 is a flowchart showing an example of a data read processing flow.

FIG. 17 is a flowchart for explaining I/O processing (hereinafter, "data read processing 1700") to be performed in the storage apparatus 100 in a case where the storage apparatus 100 receives a frame including a data read request from one of the hosts 200. The data read processing 1700 will be described below together with FIG. 11.

The FEPK 110 of the storage apparatus 100 receives the frame transmitted from the host 200 (S1701 and S1702). Upon receipt of the frame from the host 200, the FEPK 110 notifies the CMPK 120 to that effect (S1703).

When the communication control circuit 121 receives the above-described notification from the FEPK 110, the CMPK 120 transmits a drive read request to one of the MPs 131 in charge which is designated in the read request (S1704 and S1705). Upon receipt of the drive read request, the MP 131 sets the data read request in its request processing queue (S1706 and S1707).

The BEPK 140 reads drive read requests from the processing request queues in the shared memory 132 whenever necessary, and reads data designated in the read data read request (designated by, for example, a LBA (Logical Block Address)) from a corresponding one of the storage drives 151 (S1708 and S1709). The BEPK 140 transmits the read data to the communication control circuit 121 (S1710). The communication control circuit 121 writes the data read by the BEPK 140 to the cache memory 122 (S1711). The communication control circuit 121 transfers the data written in the cache memory 122 to the FEPK 110 whenever necessary (S1712). Note that, in a case where to-be-read data exists in the cache memory 122 (in a case of a cache hit), the processing of reading data from the storage drive 151 (S1705 to S1711) is omitted.

The FEPK 110 sends the host 200 in turn the read data transmitted from the communication control circuit 121 (S1713 and S1714). Upon completion of the transmission of the read data, the FEPK 110 transmits a completion report to the host 200 (S1715), and the host 200 receives the transmitted completion report (S1716).

Data Processing for Implementing MP Operating Rate Management of Embodiment

Figure 18:
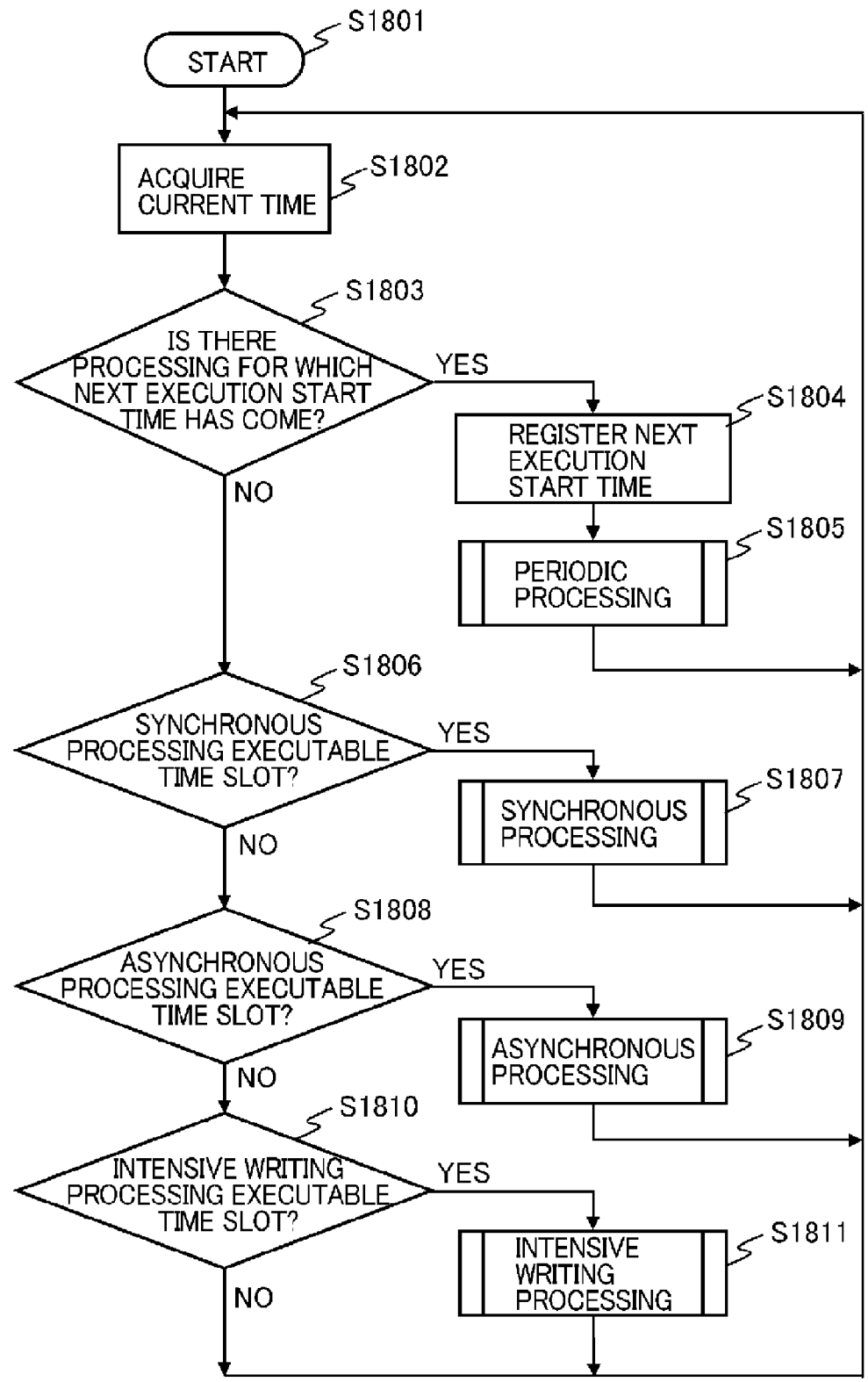
FIG. 18 is a flowchart showing an example of an MP operation schedule processing flow.

Next, descriptions are given of data processing executed by the MPs 131 to implement the MP operating rate management of the embodiment, on the basis of processing flow examples. First, FIG. 18 shows the processing flow example of the entire MP operating rate management in the storage apparatus 100 of the embodiment. In the processing flow example of FIG. 18, performed are: execution management of the synchronous processing, the asynchronous processing, and the intensive writing processing performed by each of the MPs 131 mounted on the storage apparatus 100; and periodic allocation of time slots in which each MP 131 can execute the synchronous processing, the asynchronous processing, and the intensive writing processing. Note that, when "MP operating rate management part 1330" is given as the agent of action in the description below, this means that any of the MPs 131 executes processing by executing the MP operating rate management part program.

Upon starting an MP operating rate management processing flow in S1801, the MP operating rate management part 1330 first acquires current time data from a system clock of the MPPK 130 (S1802) and determines whether there is periodic processing for which the next execution start time has come, by referring to the periodic processing management table 1345 of FIG. 14 (S1803). When determining that there is periodic processing for which the next execution start time has come (S1803, Yes), the MP operating rate management part 1330 updates the next execution start time 13452 recorded in the periodic processing management table 1345 with the next execution start time (S1804), executes the periodic processing registered in the corresponding processing type 13451 (S1805), and causes the process to return to the step of S1802. Here, only the job operating time period review processing is executed in the configuration example of the periodic processing management table 1345 of FIG. 14. However, if another periodic processing is registered, this periodic processing is also executed. The job operating time period review processing will be described later with reference to a processing flow example.

When determining in S1803 that there is no periodic processing for which the next execution start time has come (S1803, No), the MP operating rate management part 1330 determines whether it is a synchronous processing executable time slot on the basis of the current time data acquired in S1802 and the job operating time period management table 1344 illustrated in FIG. 13 (S1806). When determining that it is the synchronous processing executable time slot (S1806, Yes), the MP operating rate management part 1330 executes the synchronous processing (S1807) and causes the processing to return to the step of S1802.

Then, when determining in S1806 that it is not the synchronous processing executable time slot (S1806, No), the MP operating rate management part 1330 determines whether it is an asynchronous processing executable time slot on the basis of the current time data acquired in S1802 and the job operating time period management table 1344 illustrated in FIG. 13 (S1808). When determining that it is the asynchronous processing executable time slot (S1808, Yes), the MP operating rate management part 1330 executes the asynchronous processing (S1809) and causes the processing to return to the step of S1802.

Next, when determining in S1808 that it is not the asynchronous processing executable time slot (S1808, No), the MP operating rate management part 1330 determines whether it is a intensive writing processing executable time slot based on the current time data acquired in S1802 and the job operating time period management table 1344 illustrated in FIG. 13 (S1810). When determining that it is the intensive writing processing executable time slot (S1810, Yes), the MP operating rate management part 1330 executes the intensive writing processing (S1811) and causes the processing to return to the step of S1802. When determining that it is not the intensive writing processing executable time slot in S1810 (S1810, No), the MP operating rate management part 1330 causes the processing to directly return to S1802. By executing the MP operating rate management processing described above, each of the MPs 131 mounted on the MPPK 130 of the storage apparatus 100 can execute the previously-set data processing in accordance with the current time and, as a result, there is no time slot in which the synchronous processing cannot be executed.

Figure 19A:
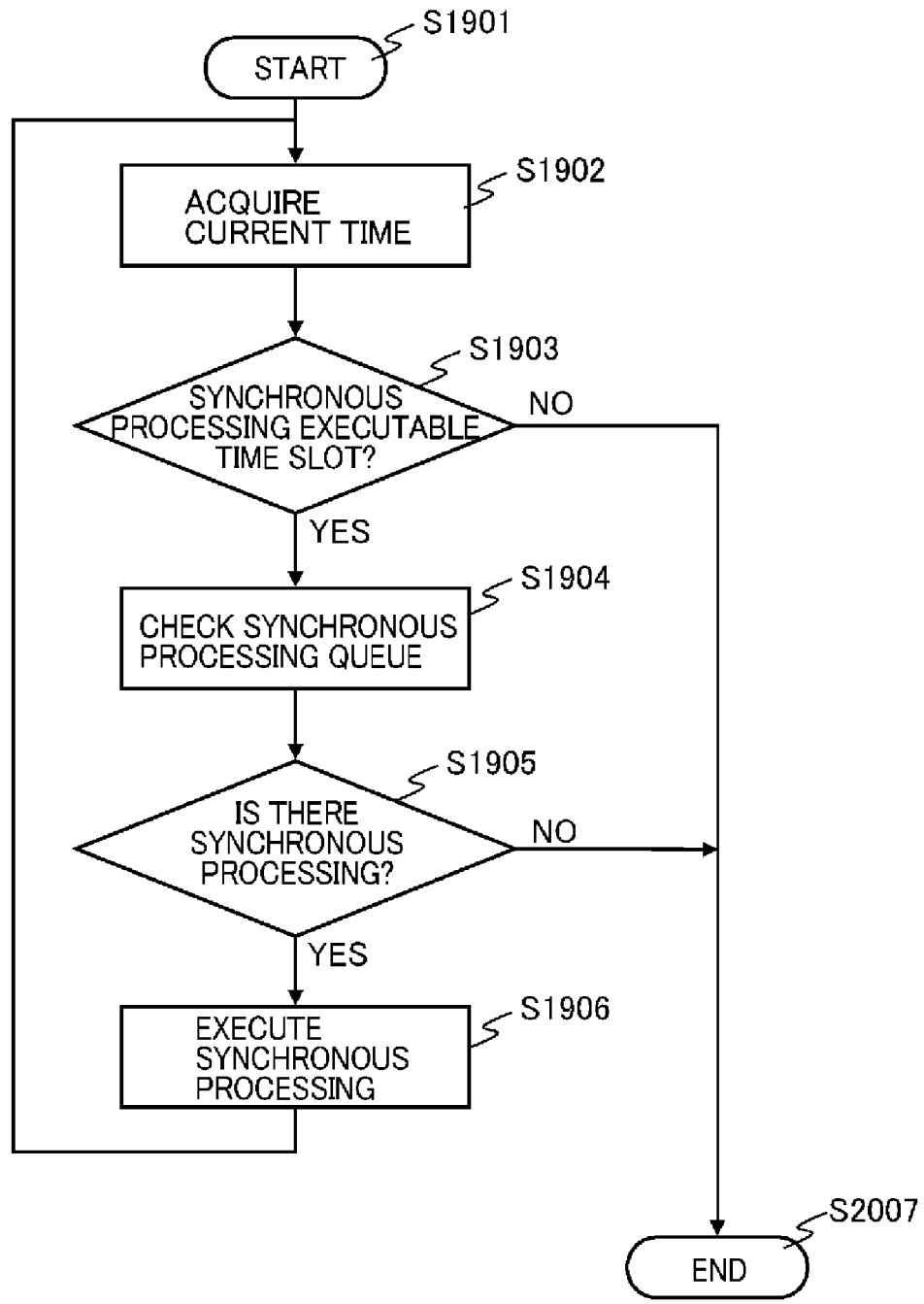
FIG. 19A is a flowchart showing an example of a synchronous processing schedule processing flow.
Figure 19B:
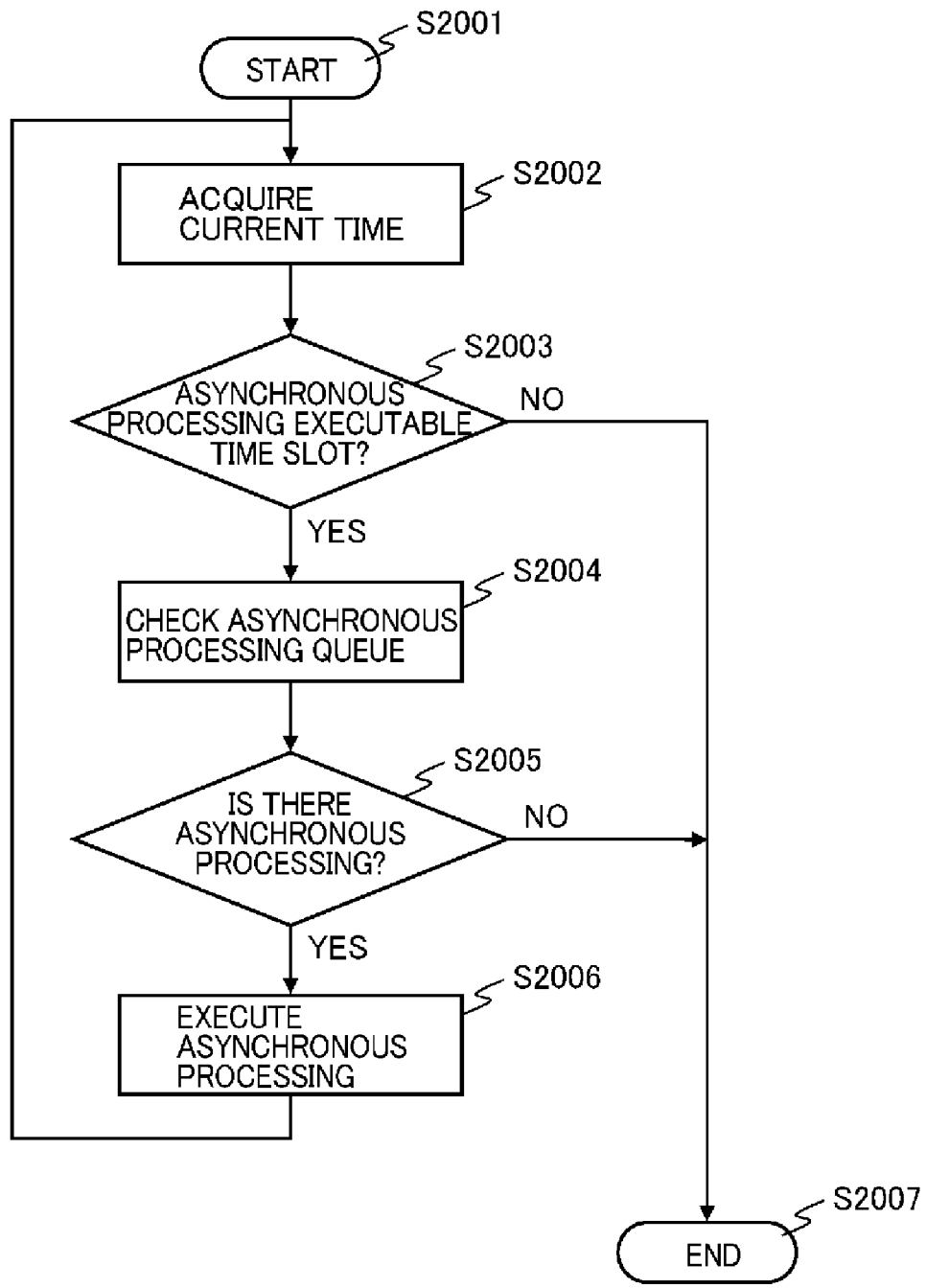
FIG. 19B is a flowchart showing an example of an asynchronous processing schedule processing flow.
Figure 19C:
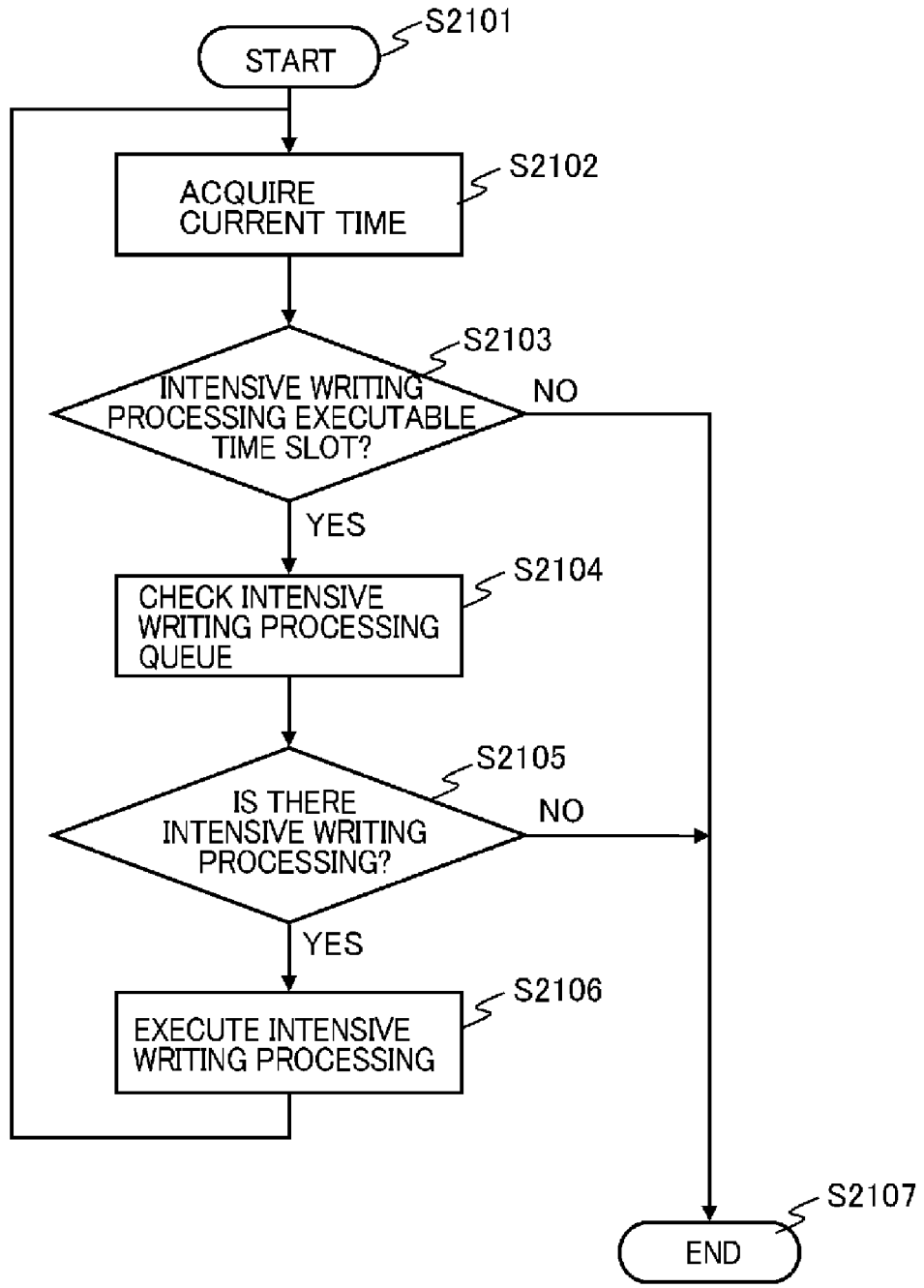
FIG. 19C is a flowchart showing an example of a intensive writing processing schedule processing flow.

Next, descriptions are given of the synchronous processing, the asynchronous processing, and the intensive writing processing executed in the MP operating rate management processing shown in FIG. 18. FIGS. 19A to 19C show processing flow examples of the synchronous processing, the asynchronous processing, and the intensive writing processing, respectively. The MP operating rate management part 1330 determines whether it is the executable time slot for the synchronous processing, the asynchronous processing, or the intensive writing processing, and executes the corresponding processing depending on the result of the determination. First, the synchronous processing is described with reference to FIG. 19A. Upon starting the synchronous processing in S1901, the MP operating rate management part 1330 first acquires the current time data from the system clock of the MPPK 130 (S1902) and determines whether it is the synchronous processing executable time slot on the basis of the recorded contents of the job operating time period management table 1344 (S1903). When determining that it is the synchronous processing executable time slot (S1903, Yes), the MP operating rate management part 1330 refers to MP processing request queues stored in the shared memory 132 of the MPPK 130 (S1904) and determines whether there is a synchronous processing queue (S1905). When determining that there is a synchronous processing queue (S1905, Yes), the MP operating rate management part 1330 executes the contents of the synchronous processing queue and causes the processing to return to S1902 (S1906). When determining in S1903 that it is not the synchronous processing executable time slot (S1903, No), the MP operating rate management part 1330 completes the synchronous processing flow and causes the processing to return to S1802 of the MP operating rate management processing. Note that the processing flow examples of the asynchronous processing and the intensive writing processing illustrated respectively in FIGS. 19B and 19C are basically the same as the synchronous processing flow example of FIG. 19A. Thus, the above description of the synchronous processing flow example of S1901 to S1907 should be read with the word "synchronous" replaced with "asynchronous" and "intensive writing" respectively for the description of S2001 to S2007 and the description of S2101 to S2107.

Figure 20:
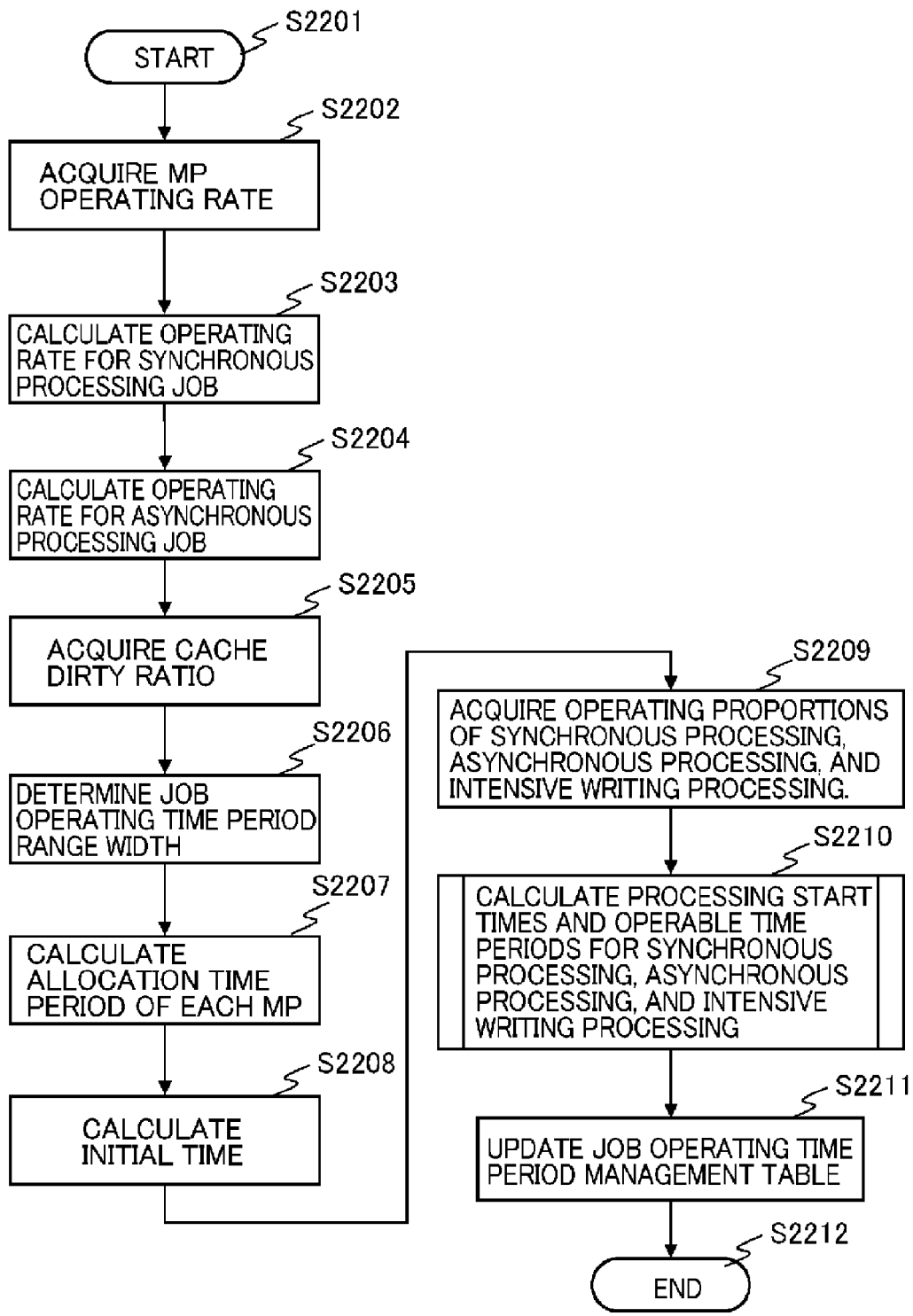
FIG. 20 is a flowchart showing an example of a job operating time period review processing flow.

Next, a description is given of the periodic processing in the processing flow example of FIG. 18. Here, the periodic processing is the job operating time period review processing and FIG. 20 shows a processing flow example thereof. In the job operating time period review processing, review of temporal allocation of the synchronous processing, the asynchronous processing, and the intensive writing processing to the MPs 131 is periodically executed on the basis of the operating rates of the MPs 131 in the past certain time. The job operating time period review processing is executed for each of the MPPKs 130 provided in the storage apparatus 100.

Upon starting the job operating time period review processing in S2201, the MP operating rate management part 1330 first refers to the MP operating rate management table 1340 for the MPPK 130 being the target of review processing and acquires the operating rates of the MPs 131 mounted on the target MPPK 130 (S2202). Then, the MP operating rate management part 1330 calculates the operating rate of the target MPPK 130 for a synchronous processing job, from synchronous processing operating rates of the MPs 131 acquired in S2202 (S2203). This operating rate of the synchronous processing job can be obtained as, for example, a simple mean value of the synchronous processing operating rates of the MPs 131 mounted on the target MPPK 130. The MP operating rate management part 1330 similarly calculates the operating rate of the target MPPK 130 for an asynchronous processing job, from asynchronous processing operating rates of the MPs 131 acquired in S2202 (S2204). Next, the MP operating rate management part 1330 refers to the cache dirty ratio table 1341 of FIG. 10 and acquires the cache dirty ratio of the cache memory 122 used for the target MPPK 130. Then, The MP operating rate management part 1330 compares the synchronous processing job operating rate, the asynchronous processing job operating rate, and the cache dirty ratio of the target MPPK 130, which are each calculated or acquired as described above, with the job operating time period range width management table 1343 illustrated in FIG. 12, and thereby acquires the range width 13433 (for example, 64 ms) set for a combination which includes the synchronous processing job operating rate, the asynchronous processing job operating rate, and the cache dirty ratio closest to the ones calculated and acquired (S2206). Next, the MP operating rate management part 1330 calculates a processing allocation time period of each MP 131, from the range width 13433 acquired in S2206 and the number of MPs 131 mounted on the target MPPK 130 (S2207). In the embodiment, for example, the range width 13433 is 64 ms and four MPs 131 are mounted on each MPPK 130. Hence, the processing allocation time period is 64/4=16 ms.

Next, the MP operating rate management part 1330 acquires the current time data from the system clock of the storage apparatus 100 and adds an offset of a predetermined time (for example, 100 ms) to the current time to calculate an initial time of starting application of the executing job operating time period review processing (S2208). Then the MP operating rate management part 1330 compares the synchronous processing job operating rate, the asynchronous processing job operating rate, and the cache dirty ratio of the target MPPK 130, which have already been each calculated or acquired, with the job operating time period tuning table 1342 of FIG. 11, and acquires the corresponding synchronous processing operating proportion 13424, asynchronous processing operating proportion 13425, and intensive writing processing operating proportion 13426 (S2209).

Next, the MP operating rate management part 1330 calculates processing start times and operable time periods for the synchronous processing, the asynchronous processing, and the intensive writing processing, for each of the MPs 131, by using the synchronous processing operating proportion 13424, the asynchronous processing operating proportion 13425, and the intensive writing processing operating proportion 13426 acquired in S2209 (S2210). The MP operating rate management part 1330 then updates the job operating time period management table 1344 with the result of the calculation and terminates the processing (S2211 and S2212). By the job operating time period review processing described above, the processing can be assigned to the MPs 131 of each MPPK 130 in such a way that at least one of the MPs 131 executes the synchronous processing at any point in the predetermined range width.

Figure 21A:
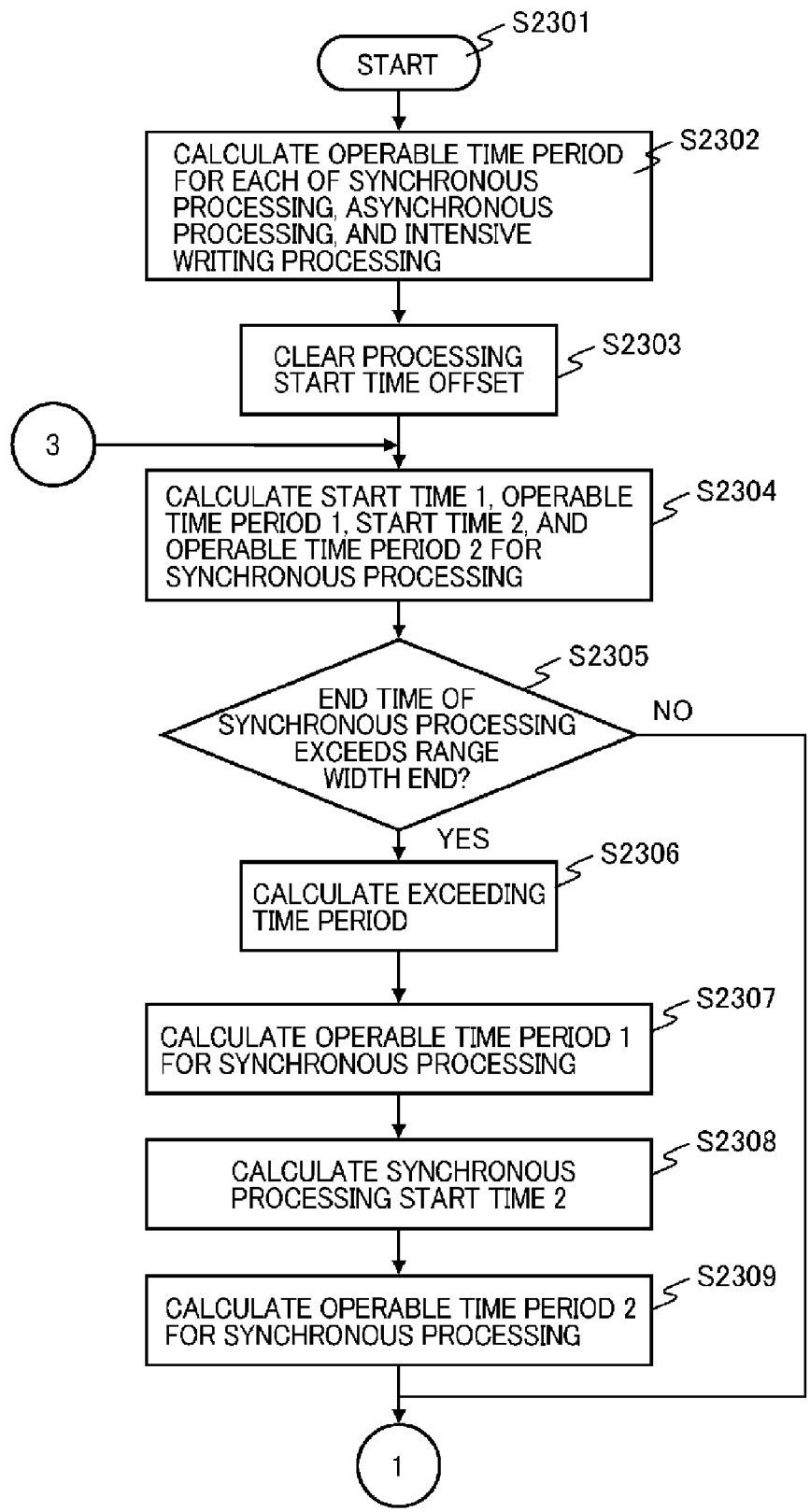
FIG. 21A is a flowchart showing an example of a flow of calculating a processing start time and an operable time period for each of the synchronous processing, the asynchronous processing, and the intensive writing processing.
Figure 21B:
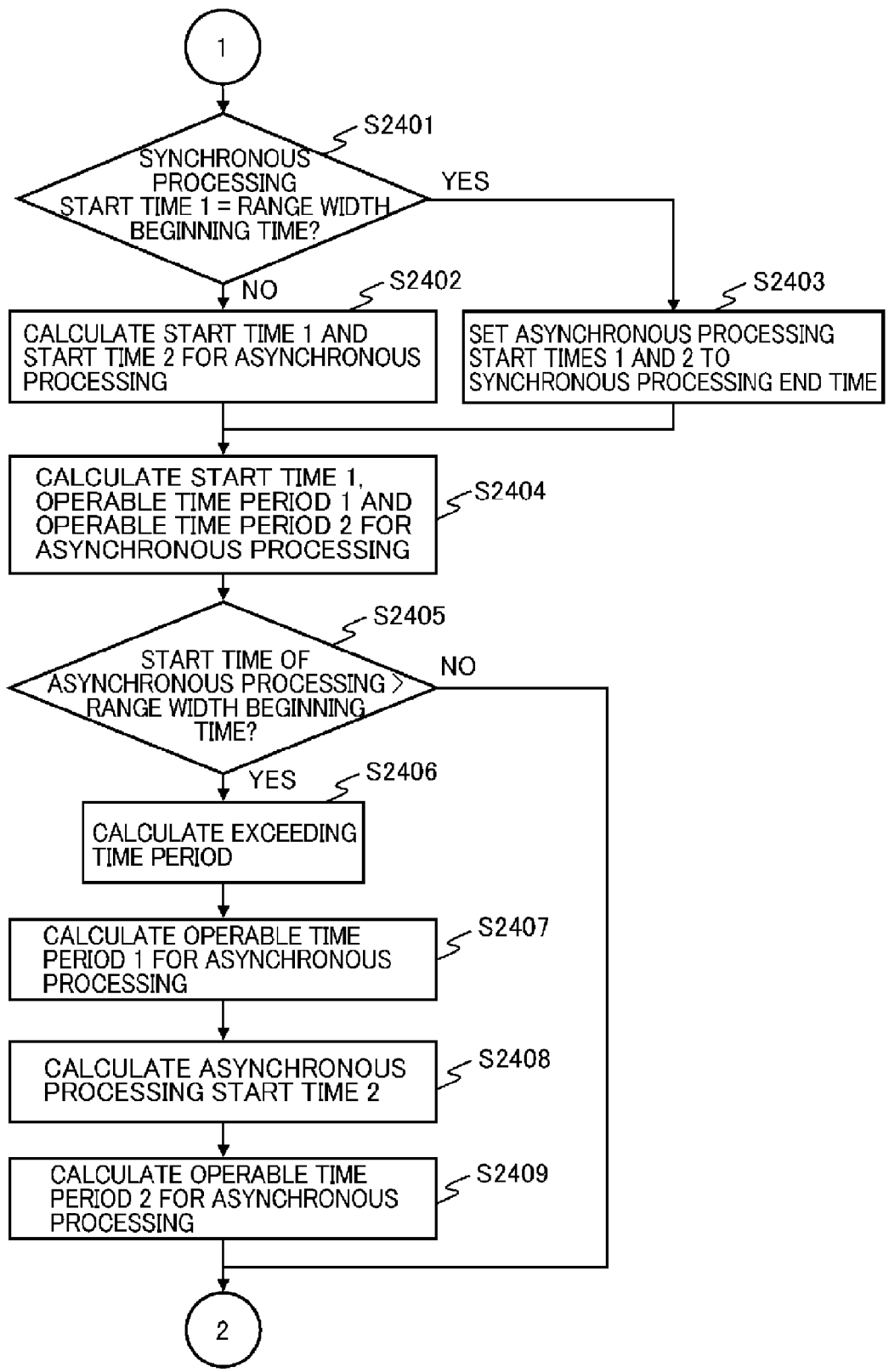
FIG. 21B is a flowchart showing the example of the flow of calculating the processing start time and the operable time period for each of the synchronous processing, the asynchronous processing, and the intensive writing processing.
Figure 21C:
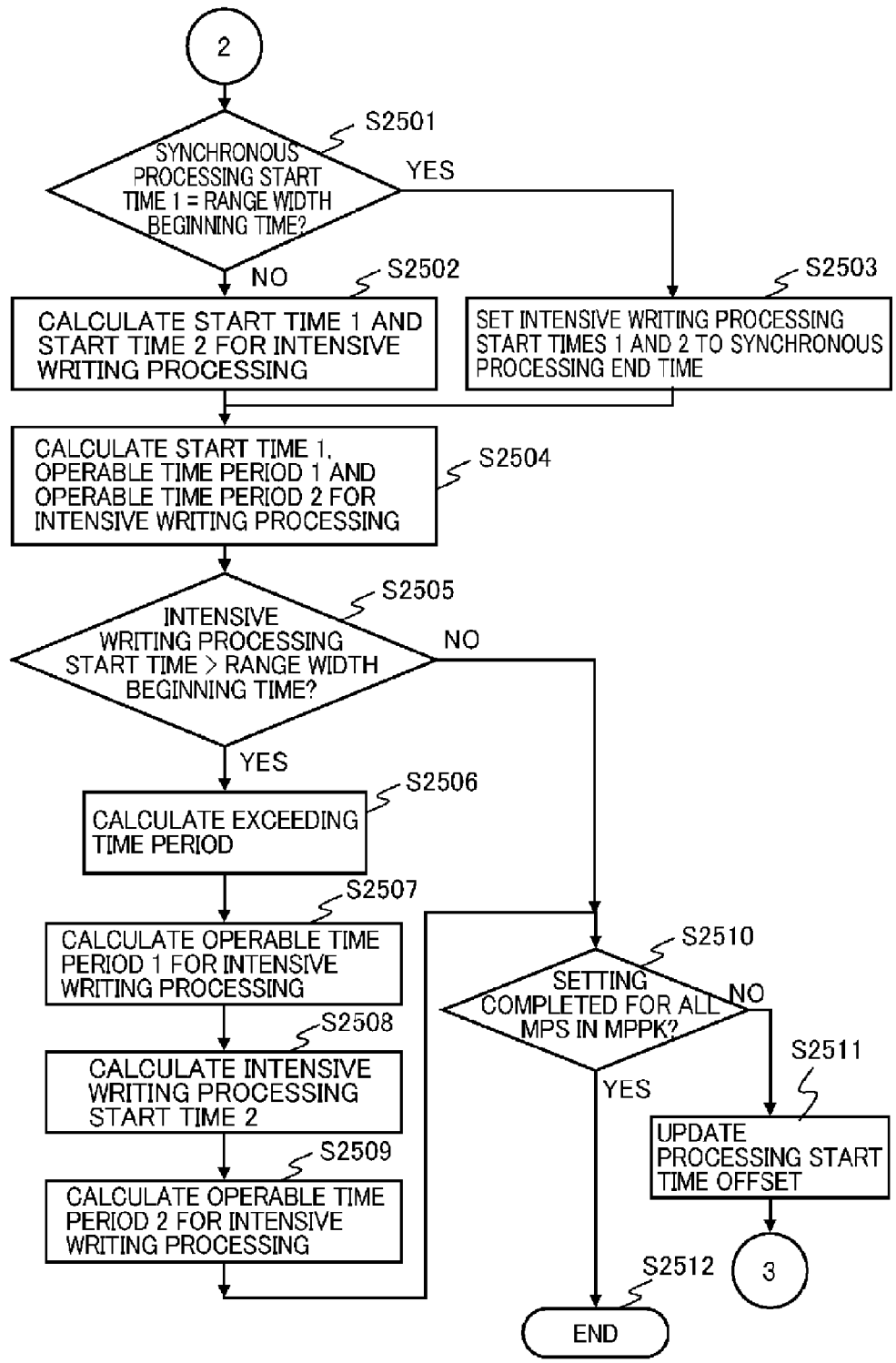
FIG. 21C is a flowchart showing the example of the flow of calculating the processing start time and the operable time period for each of the synchronous processing, the asynchronous processing, and the intensive writing processing.

Next, a description is given of processing of calculating the processing start times and the operable time periods for the synchronous processing, the asynchronous processing, and intensive writing processing in the processing flow example of the job operating time period review processing illustrated in FIG. 20. FIGS. 21A to 21C show processing flow examples of processing of calculating the processing start times and the operable time periods for the synchronous processing, the asynchronous processing, and the intensive writing processing. The processing of calculating the processing start times and the operable time periods for the synchronous processing, the asynchronous processing, and the intensive writing processing is processing in which the processing start times and the operable time periods for the synchronous processing, the asynchronous processing, and the intensive writing processing are calculated for each of the MPs 131 of the target MPPK 130 in the job operating time period management table 1344 illustrated in FIG. 13 and the processing execution schedule of each MP 131 is determined from this processing.

Upon starting the processing in S2301, the MP operating rate management part 1330 calculates the operable time period for each of the synchronous processing, the asynchronous processing, and the intensive writing processing (S2302). The synchronous processing operating proportion 13424, the asynchronous processing operating proportion 13425, and the intensive writing processing operating proportion 13426 acquired from the job operating time period tuning table 1342 are used for this calculation and the operable time period is calculated as follows, for example:

Operable time period for synchronous processing=
(Operable proportion for synchronous processing×Range width).

The operable time period for the asynchronous processing and the operable time period for the intensive writing processing are calculated similarly. Next, the MP operating rate management part 1330 clears the processing start time offset to zero (S2303). This step shows that the synchronous processing to be set is started from the beginning of the range width.

Then, the MP operating rate management part 1330 calculates the processing start time 1, the operable time period 1, the processing start time 2, and the operable time period 2 for the synchronous processing. Here, the following equations are satisfied:

Synchronous processing start time 1=(current time+processing start time offset)

Synchronous processing start time 2=synchronous processing start time 1

Operable time period 1 for synchronous processing=Operable time period 2 for synchronous processing=Operable time period for synchronous processing.

Next, the MP operating rate management part 1330 determines whether the end time of the operable time period 1 or 2 calculated in S2304 exceeds the end of the range width (S2305). When determining that the end time does not exceed the end of the range width (S2305, No), the MP operating rate management part 1330 causes the processing to move to S2401 of FIG. 21B and calculates the processing start time and the operable time period for the asynchronous processing.

On the other hand, when determining that the end time of the operable time period 1 or 2 calculated in S2304 exceeds the end of the range width (S2305, Yes), the MP operating rate management part 1330 calculates the time length by which the end of the operable time period for the synchronous processing exceeds the end of the range width as follows (S2306):

> Exceeding time period=(Operable time period 1 for synchronous processing+Processing start time offset)−Job operating time period range width.

In this case, the operable time period 1 for the synchronous processing which can be set is calculated as follows (S2307):

> Operable time period 1 for synchronous processing=Operable time period 1 for synchronous processing in S2304−Exceeding time period.

The end of the operable time period 1 for the synchronous processing thus coincides with the end of the range width.

Next, the exceeding time period by which the end of the operable time period exceeds the end of the range width is set as the operable time period 2 for the synchronous processing. First, the synchronous processing start time 2 being the start time of the operable time period 2 for the synchronous processing is calculated as follows (S2308):

> Synchronous processing start time 2=Current time.

Then the operable time period 2 for the synchronous processing is set as follows (S2309):

> Operable time period 2 for synchronous processing=Exceeding time period.

A time slot in which the synchronous processing can be executed is thus set for one of the MPs 131 on the MPPK 130.

Next, a description is given of setting of the start time and the operable time period for the asynchronous processing, by using FIG. 21B. The MP operating rate management part 1330 determines whether the set synchronous processing start time 1 coincides with the beginning time of the range width (S2401). When determining that there is a coincidence (S2401, Yes), the MP operating rate management part 1330 sets a synchronous processing end time (=synchronous processing start time+operable time period for synchronous processing) as the asynchronous processing start times 1 and 2 (S2403). On the other hand, when determining that the set synchronous processing start time 1 does not coincide with the beginning time of the range width (S2401, No), the MP operating rate management part 1330 calculates the processing start time 1 and the processing start time 2 for the asynchronous processing (S2402). Here, the following equations are satisfied:

> Asynchronous processing start time 1=(Synchronous processing start time 1+Operable time period 1 for synchronous processing)
>
> Asynchronous processing start time 2=(Synchronous processing start time 1+Operable time period 1 for synchronous processing).

Then, the MP operating rate management part 1330 calculates the operable time periods 1 and 2 for the asynchronous processing (S2404). Here, the following equation is satisfied:

> Operable time period 1 for asynchronous processing=Operable time period 2 for asynchronous processing=Operable time period for asynchronous processing calculated in S2302.

Next, the MP operating rate management part 1330 determines whether the asynchronous processing start time 1 or 2 calculated in S2402 or S2403 is after the range width beginning time (S2405). When determining that the asynchronous processing start time 1 or 2 is at or before the range width beginning time (S2405, No), the MP operating rate management part 1330 causes the processing to move to S2501 of FIG. 21C and starts the processing of calculating the start time and the operable time period for the intensive writing processing.

On the other hand, when determining that the asynchronous processing start time 1 or 2 calculated in S2402 or S2403 is after the range width beginning time (S2405, Yes), the MP operating rate management part 1330 calculates a time length by which the beginning of the operable time period for the asynchronous processing exceeds the beginning of the range width as follows (S2406):

> Exceeding time period=(Range width beginning time−Asynchronous processing start time 1).

Then, the operable time period 1 for the asynchronous processing which can be set is calculated as follows (S2407):

> Operable time period 1 for asynchronous processing= (Operable time period 1 for asynchronous processing in S2404−Exceeding time period).

The beginning of the operable time period 1 for the asynchronous processing thus coincides with the beginning of the range width.

Next, the exceeding time period by which the beginning of the operable time period exceeds the beginning of the range width is set as the operable time period 2 for the asynchronous processing. First, the asynchronous processing start time 2 being the start time of the operable time period 2 for the asynchronous processing is calculated (S2408) as follows:

> Asynchronous processing start time 2=(Range width beginning time+Range width−Exceeding time period).

Then, the operable time period 2 for the asynchronous processing is set as follows (S2409):

> Operable time period 2 for asynchronous processing=Exceeding time period.

A time slot in which the asynchronous processing can be executed is thus set for one of the MPs 131 on the MPPK 130.

Next, a description is given of setting of the start time and the operable time period for the intensive writing processing, by using FIG. 21C. The setting of the start time and the operable time period for the intensive writing processing is similar to the setting of the start time and the operable time period for the asynchronous processing described with reference to FIG. 21B. First, the MP operating rate management part 1330 determines whether the set synchronous processing start time 1 coincides with the beginning time of the range width (S2501). When determining that there is a coincidence (S2501, Yes), the MP operating rate management part 1330 sets the synchronous processing end time (=synchronous processing start time+operable time period for synchronous processing) as the intensive writing processing start times 1 and 2 (S2503). On the other hand, when determining that the set synchronous processing start time 1 does not coincide with the beginning time of the range width (S2501, No), the MP operating rate management part 1330 calculates the processing start time 1 and the processing start time 2 for the intensive writing processing (S2502). Here, the following equations are satisfied:

> Intensive writing processing start time 1=(Synchronous processing start time 1+Operable time period 1 for synchronous processing)

Intensive writing processing start time 2=(Synchronous processing start time 1+Operable time period 1 for synchronous processing).

Then, the MP operating rate management part 1330 calculates the operable time periods 1 and 2 for the intensive writing processing (S2504). Here, the following equation is satisfied:

Operable time period for intensive writing processing=Operable time period 2 for intensive writing processing=Operable time period for intensive writing processing calculated in S2302.

Next, the MP operating rate management part 1330 determines whether the intensive writing processing start time 1 or 2 calculated in S2502 or S2503 is after the range width beginning time (S2505). When determining that the intensive writing processing start time 1 or 2 is at or before the range width beginning time (S2505, No), the MP operating rate management part 1330 causes the processing to move to S2510 and determines whether the setting of the start times and the operable time periods for the synchronous processing, the asynchronous processing, and the intensive writing processing are completed for all of the MPs 131 in the target MPPK 130 (S2510). When determining that the setting is completed (S2510, Yes), the MP operating rate management part 1330 terminates the processing (S2512). When determining in S2510 that the setting of the start times and the operable time periods for the synchronous processing, the asynchronous processing, and the intensive writing processing are not completed for all of the MPs 131 in the target MPPK 130 (S2510, No), the MP operating rate management part 1330 updates the processing start time offset by adding the range width to the processing start time in S2303 (S2511) and causes the processing to return to S2304 of FIG. 21A.

On the other hand, when determining that the intensive writing processing start time 1 or 2 calculated in S2502 or S2503 is after the range width beginning time (S2505, Yes), the MP operating rate management part 1330 calculates a time length by which the beginning of the operable time period for the intensive writing processing exceeds the beginning of the range width as follows (S2506):

Exceeding time period=(Range width beginning time−Intensive writing processing start time 1).

Then, the operable time period 1 for the intensive writing processing which can be set is calculated as follows (S2507):

Operable time period 1 for intensive writing processing=(Operable time period 1 for intensive writing processing in S2504−Exceeding time period).

The beginning of the operable time period 1 for the intensive writing processing thus coincides with the beginning of the range width.

Next, the exceeding time period by which the beginning of the operable time period exceeds the beginning of the range width is set as the operable time period 2 for the intensive writing processing. First, the intensive writing processing start time 2 being the start time of the operable time period 2 for the intensive writing processing is calculated (S2508) as follows:

Intensive writing processing start time 2=(Range width beginning time+Range width−Exceeding time period).

Then, the operable time period 2 for the intensive writing processing is set as follows (S2509):

Operable time period 2 for intensive writing processing=Exceeding time period.

Thereafter, the MP operating rate management part 1330 causes the processing to move to S2510 described above. A time slot in which the intensive writing processing can be executed is thus set for one of the MPs 131 on the MPPK 130.

Figure 22:
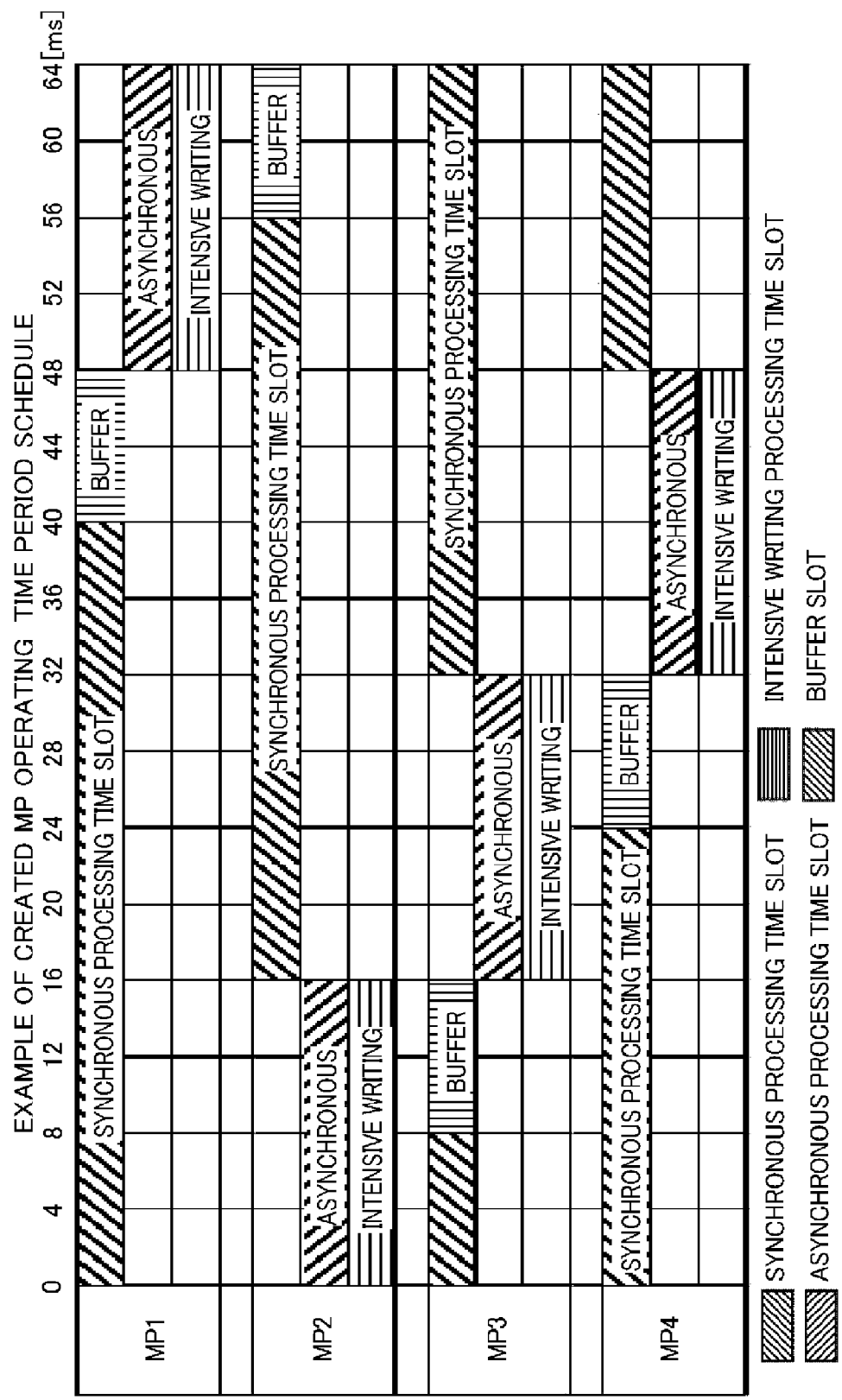
FIG. 22 is an example of MP operable time period setting created through MP operating rate management processing of the embodiment.

FIG. 22 shows an example of the MP operating time schedule created by the MP operating rate management of the embodiment described above. FIG. 22 is assumed to show a schedule created for the MPPK 130 on which the MP1 to MP4 are mounted, and shows that the synchronous processing time slot is always set for at least one of the MPs 131 in the operating range width of 64 ms. Note that, although the asynchronous processing time slot and the intensive writing processing time slot are set to overlap each other in the example of FIG. 22, the synchronous processing time slot and the intensive writing processing time slot may be set separately from each other as described in relation with FIGS. 21B and 21C of the aforementioned embodiment. Moreover, as shown in FIG. 22, a buffer slot in which no processing is performed may be provided as needed between any two adjacent processing time slots.

The embodiment of the present invention described above in detail can provide a storage apparatus capable of improving the response to host I/O requests and a control method of the storage apparatus.

The description has been heretofore given of the embodiment. However, the above embodiment is presented only to facilitate understanding of the present invention, and thus not to provide limited interpretation of the present invention. The present invention can be modified or improved without departing from the gist thereof, and the equivalents of the present invention are also included in the present invention.

The invention claimed is:

1. A storage apparatus including a storage medium for providing an external apparatus with a data storage area, the storage apparatus comprising:
    a processing unit including a plurality of processors which execute synchronous processing and asynchronous processing other than the synchronous processing, the synchronous processing being processing to be executed immediately in response to data I/O requests from the external apparatus, the asynchronous processing being processing to be executed as needed in response to a processing request generated in the storage apparatus;
    a temporary storage unit which provides a storage area where any of the processors temporarily stores write target data in accordance with a data write request among the data I/O requests; and
    a processor operating rate management part which manages a time schedule for each of the plurality of processors to execute the synchronous processing or the asynchronous processing, wherein the processor operating rate management part acquires execution proportions of the synchronous processing and the asynchronous processing executed by each of the plurality of processors in a past predetermined time period and an usage state of the temporary storage unit used by the plurality of processors,
    compares the acquired execution proportions and the usage state with execution proportions of the synchronous processing, the asynchronous processing, and intensive writing processing set in advance for each of the processors, the intensive writing processing being processing of writing from the temporary storage unit to the storage medium, the execution proportion of the intensive writing processing defined corresponding to the usage state of the temporary storage unit, and sets an operation schedule of the plurality of processors in such a way that at least one of the processors executes the synchronous processing at any point in a predetermined execution proportion management unit time.

2. The storage apparatus according to claim 1, wherein the execution proportion management unit time includes processor allocation unit times which are obtained by dividing the execution proportion management unit time by the number of the plurality of processors.

3. The storage apparatus according to claim 1, wherein each of the plurality of processors refers to the operation schedule to determine which of the synchronous processing, the asynchronous processing and the intensive writing processing the processor itself is enabled to execute, refers to a processing request queue formed as a queue of processing requests to be executed by the processor itself, and, if there is a processing request matching the determined processing, executes the processing request.

4. The storage apparatus according to claim 1, wherein the execution proportion management unit time is set in advance in association with the execution proportions of the synchronous processing and the asynchronous processing executed by the plurality of processors and the usage state of the temporary storage unit.

5. The storage apparatus according to claim 1, wherein the processor operating rate management part calculates a synchronous processing operable time slot indicating a time slot in which the synchronous processing is executable in the execution proportion management unit time, in accordance with the execution proportion management unit time and the execution proportion of the synchronous processing for each of the processors in the past, and sets the synchronous processing operable time slot so that the synchronous processing operable time slot starts from a beginning time of the execution proportion management unit time.

6. The storage apparatus according to claim 1, wherein the processor operating rate management part calculates an asynchronous processing operable time slot indicating a time slot in which the asynchronous processing is executable in the execution proportion management unit time and a intensive writing processing operable time slot indicating a time slot in which the intensive writing processing is executable in the execution proportion management unit time, in accordance with the execution proportion management unit time and the execution proportion of the asynchronous processing or the execution proportion of the intensive writing processing executed by each of the processors in the past, and sets the asynchronous processing operable time slot and the intensive writing processing operable time slot within the execution proportion management unit time.

7. The storage apparatus according to claim 1, wherein the usage state of the temporary storage unit is a proportion of a volume of data not written to the storage medium yet to an entire storage capacity of the temporary storage unit.

8. A method of controlling a storage apparatus including a storage medium for providing an external apparatus with a data storage area, the storage apparatus comprising;
a processing unit including a plurality of processors which execute synchronous processing and asynchronous processing other than the synchronous processing, the synchronous processing being processing to be executed immediately in response to data I/O requests from the external apparatus, the asynchronous processing being processing to be executed as needed in response to a processing request generated in the storage apparatus;
a temporary storage unit which provides a storage area where any of the processors temporarily stores write target data in accordance with a data write request among the data I/O requests; and
a processor operating rate management part which manages a time schedule for each of the plurality of processors to execute the synchronous processing or the asynchronous processing, the method comprising the steps, executed by the processor operating rate management part, of:
acquiring execution proportions of the synchronous processing and the asynchronous processing executed by each of the plurality of processors in a past predetermined time period and an usage state of the temporary storage unit used by the plurality of processors;
comparing the acquired execution proportions and the usage state with execution proportions of the synchronous processing, the asynchronous processing, and intensive writing processing set in advance for each of the processors, the intensive writing processing being processing of writing from the temporary storage unit to the storage medium, the execution proportion of the intensive writing processing defined corresponding to the usage state of the temporary storage unit, and setting an operation schedule of the plurality of processors in such a way that at least one of the processors executes the synchronous processing at any point in a predetermined execution proportion management unit time.

9. The method of controlling a storage apparatus according to claim 8, wherein the execution proportion management unit time includes processor allocation unit times which are obtained by dividing the execution proportion management unit time by the number of the plurality of processors.

10. The method of controlling a storage apparatus according to claim 8, wherein each of the plurality of processors refers to the operation schedule to determine which of the synchronous processing, the asynchronous processing and the intensive writing processing the processor itself is enabled to execute, refers to a processing request queue formed as a queue of processing requests to be executed by the processor itself, and, if there is a processing request matching the determined processing, executes the processing request.

11. The method of controlling a storage apparatus according to claim 8, wherein the execution proportion management unit time is set in advance in association with the execution proportions of the synchronous processing and the asynchronous processing executed by the plurality of processors and the usage state of the temporary storage unit.

12. The method of controlling a storage apparatus according to claim 8, wherein the processor operating rate management part calculates a synchronous processing operable time slot indicating a time slot in which the synchronous processing is executable in the execution proportion management unit time, in accordance with the execution proportion management unit time and the execution proportion of the synchronous processing for each of the processors in the past, and sets the synchronous processing operable time slot so that the synchronous processing operable time slot starts from a beginning time of the execution proportion management unit time.

13. The method of controlling a storage apparatus according to claim 8, wherein the processor operating rate management part calculates an asynchronous processing operable time slot indicating a time slot in which the asynchronous processing is executable in the execution proportion management unit time and an intensive writing processing operable time slot indicating a time slot in which the intensive writing processing is executable in the execution proportion management unit time, in accordance with the execution proportion management unit time and the execution proportion of the asynchronous processing or the execution proportion of the intensive writing processing executed by each of the processors in the past, and sets the asynchronous processing operable time slot and the intensive writing processing operable time slot within the execution proportion management unit time.

14. The method of controlling a storage apparatus according to claim 8, wherein the usage state of the temporary storage unit is a proportion of a volume of data not written to the storage medium yet to an entire storage capacity of the temporary storage unit.

15. A storage apparatus including a storage medium for providing an external apparatus with a data storage area, the storage apparatus comprising:
- a processing unit including a plurality of processors which execute synchronous processing and asynchronous processing other than the synchronous processing, the synchronous processing being processing to be executed immediately in response to data I/O requests from the external apparatus, the asynchronous processing being processing to be executed as needed in response to a processing request generated in the storage apparatus;
- a temporary storage unit which provides a storage area where any of the processors temporarily stores write target data in accordance with a data write request among the data I/O requests; and
- a processor operating rate management part which manages a time schedule for each of the plurality of processors to execute the synchronous processing or the asynchronous processing, wherein the processor operating rate management part acquires execution proportions of the synchronous processing and the asynchronous processing executed by each of the plurality of processors in a past predetermined time period and a proportion of a volume of data not written to the storage medium yet to an entire storage capacity of the temporary storage unit, the proportion being an usage state of the temporary storage unit used by the plurality of processors,
- compares the acquired execution proportions and the usage state with execution proportions of the synchronous processing, the asynchronous processing, and intensive writing processing set in advance for each of the processors, the intensive writing processing being processing of writing from the temporary storage unit to the storage medium, the execution proportion of the intensive writing processing defined corresponding to the usage state of the temporary storage unit, and sets an operation schedule of the plurality of processors in such a way that at least one of the processors executes the synchronous processing at any point in a predetermined execution proportion management unit time,
- the execution proportion management unit time includes processor allocation unit times which are obtained by dividing the execution proportion management unit time by the number of the plurality of processors,
- each of the plurality of processors refers to the operation schedule to determine which of the synchronous processing, the asynchronous processing and the intensive writing processing the processor itself is enabled to execute, refers to a processing request queue formed as a queue of processing requests to be executed by the processor itself, and, if there is a processing request matching the determined processing, executes the processing request,
- the execution proportion management unit time is set in advance in association with the execution proportions of the synchronous processing and the asynchronous processing executed by the plurality of processors and the usage state of the temporary storage unit,
- the processor operating rate management part calculates a synchronous processing operable time slot indicating a time slot in which the synchronous processing is executable in the execution proportion management unit time, in accordance with the execution proportion management unit time and the execution proportion of the synchronous processing for each of the processors in the past, and sets the synchronous processing operable time slot so that the synchronous processing operable time slot starts from a beginning time of the execution proportion management unit time, and
- the processor operating rate management part calculates an asynchronous processing operable time slot indicating a time slot in which the asynchronous processing is executable in the execution proportion management unit time and a intensive writing processing operable time slot indicating a time slot in which the intensive writing processing is executable in the execution proportion management unit time, in accordance with the execution proportion management unit time and the execution proportion of the synchronous processing or the execution proportion of the intensive writing processing executed by each of the processors in the past, and sets the asynchronous processing operable time slot and the intensive writing processing operable time slot within the execution proportion management unit time.

* * * * *